US009167386B2

(12) United States Patent
Valaee et al.

(10) Patent No.: US 9,167,386 B2
(45) Date of Patent: Oct. 20, 2015

(54) SYSTEM, METHOD AND COMPUTER PROGRAM FOR DYNAMIC GENERATION OF A RADIO MAP

(71) Applicant: The Governing Council of the University of Toronto, Toronto (CA)

(72) Inventors: Shahrokh Valaee, Toronto (CA); Chen Feng, Markham (CA)

(73) Assignee: THE GOVERNING COUNCIL OF THE UNIVERSITY OF TORONTO, Toronto, Ontario (CA)

(*) Notice: Subject to any disclaimer, the term of this patent is extended or adjusted under 35 U.S.C. 154(b) by 171 days.

(21) Appl. No.: 13/927,510

(22) Filed: Jun. 26, 2013

(65) Prior Publication Data

US 2014/0011518 A1 Jan. 9, 2014

Related U.S. Application Data

(60) Provisional application No. 61/664,459, filed on Jun. 26, 2012.

(51) Int. Cl.
*H04W 24/00* (2009.01)
*H04W 4/02* (2009.01)
*H04W 64/00* (2009.01)
*G01S 5/02* (2010.01)
*H04W 4/04* (2009.01)

(52) U.S. Cl.
CPC ............. *H04W 4/025* (2013.01); *G01S 5/0252* (2013.01); *H04W 64/00* (2013.01); *H04W 4/043* (2013.01)

(58) Field of Classification Search
USPC ...................... 455/456.1, 524, 450
See application file for complete search history.

(56) References Cited

U.S. PATENT DOCUMENTS

| 8,831,622 | B2* | 9/2014 | Shih et al. | 455/450 |
| 8,948,809 | B2* | 2/2015 | Oka et al. | 455/524 |
| 2005/0213431 | A1* | 9/2005 | Wang et al. | 367/118 |
| 2011/0279324 | A1 | 11/2011 | Bolotski et al. | |
| 2012/0072106 | A1* | 3/2012 | Han et al. | 701/410 |

(Continued)

OTHER PUBLICATIONS

World Intellectual Property Office, International Search Report dated Sep. 18, 2013, issued in corresponding International Patent Application No. PCT/CA2013/000602.

(Continued)

*Primary Examiner* — Jinsong Hu
*Assistant Examiner* — Jean Chang
(74) *Attorney, Agent, or Firm* — Norton Rose Fulbright Canada LLP; Maya Medeiros

(57) ABSTRACT

Embodiments described herein provide a system, method and computer program for dynamic radio map generation, which may be used for indoor positioning of one or more mobile devices based on received signal strength (RSS) in some examples. In an aspect, a dynamic scheme may be used to learn the RSS radio map from only a small number of fingerprint samples. Compressive sensing may be applied to build the graph structure and calculate the graph weight in some embodiments. Once the RSS radio map is learned, a mobile device may be located and location based services can be provided to the user in some example embodiments. An indoor learning and positioning system on a mobile device may be used to evaluate the performance. Embodiments described herein may not require a large amount of offline calibrations, which may reduce the labor cost of collecting fingerprints significantly while maintaining a satisfactory level of localization accuracy.

26 Claims, 20 Drawing Sheets

(56) References Cited

U.S. PATENT DOCUMENTS

| | | | |
|---|---|---|---|
| 2012/0149415 | A1 | 6/2012 | Valaee et al. |
| 2013/0053066 | A1* | 2/2013 | Khorashadi et al. ........ 455/456.2 |
| 2013/0096922 | A1* | 4/2013 | Asaei et al. ................... 704/270 |
| 2013/0234894 | A1* | 9/2013 | Oka et al. ...................... 342/451 |
| 2013/0236112 | A1* | 9/2013 | Oka et al. ...................... 382/232 |
| 2013/0238681 | A1* | 9/2013 | Oka et al. ...................... 708/250 |

OTHER PUBLICATIONS

E. Gokcay and J. Principe, "Information theoretic clustering," IEEE Trans. on Pattern Analysis and Machine Intelligence, vol. 24, No. 2, pp. 158-172, Feb. 2002.

M. Belkin, I. Matveeva, and P. Niyogi, "Regularization and semi-supervised learning on large graphs," In Proceedings of COLT, pp. 624-638, 2004.

P. Bahl and V. N. Padmanabhan, "RADAR: An in-building RF-based user location and tracking system," INFOCOM 2002, vol. 2, pp. 775-784, 2002.

M. Youssef and A. Agrawala, "The horus WLAN location determination system," Proceedings of the Third International Conference on Mobile Systems, Applications, and Services, pp. 205-218, 2005.

"Ekahau," 2006. [Online]. Available: http://www.ekahau.com/.

C. Feng, W. S. A. Au, S. Valaee, and Z. H. Tan, "Compressive sensing based indoor positioning using RSS of WLAN access points," INFOCOM 2010, pp. 1-9, Mar. 2010.

E. J. Candes and M. B. Wakin, "An introduction to compressive sampling," IEEE Signal Processing Magazine, vol. 25, No. 2, pp. 21-30, Mar. 2008.

J. Romberg, "Imaging via compressive sampling," IEEE Signal Processing Magazine, vol. 25, No. 2, pp. 14-20, Mar. 2008.

A. Goldsmith, Wireless Communications, 1st ed. Cambridge University Press, 2005.

K. Kaemarungsi and P. Krishnamurthy, "Modeling of indoor positioning systems based on location fingerprinting," INFOCOM 2004, vol. 2, pp. 1012-1022, Mar. 2004.

J. Ma, X. Li, X. Tao, and J. Lu, "Cluster filtered KNN: A WLAN-based indoor positioning scheme," International Symposium on a World of Wireless, Mobile and Multimedia Networks, pp. 1-8, Jun. 2008.

A.Kushki, K. N. Plataniotis, and A. N. Venetsanopoulos, "Kernel-based positioning in wireless local area networks," IEEE Trans. on Mobile Computing, vol. 6, No. 6, pp. 689-705, Jun. 2007.

C.Feng, W. S. A. Au, S. Valaee, and Z. H. Tan, "Orientation-aware indoor localization using affinity propagation and compressive sensing," IEEE The Thrid International Workshop on Computational Advances in Multi-Sensor Adaptive Processing, CAMSAP, pp. 261-264, Dec. 2009.

C. Feng, S. Valaee, and Z. H. Tan, "Multiple target localization using compressive sensing," IEEE Global Telecommunications Conference, GLOBECOM, pp. 1-6, Dec. 2009.

B. J. Frey and D. Dueck, "Clustering by passing messages between data points," Science, vol. 315, No. 1, pp. 972-976, Feb. 2007.

K. Chintalapudi, A. Iyer, and V. Padmanabhan, "Indoor localization without the pain," MobiCom, pp. 173-184, Sep. 2010.

X. Zhu, Z. Ghahramani, T. Jaakkola, and M. Abstract, "Semi-supervised learning with graphs," Technical Report, CMU-LTI-05-192, May 2005.

C. Feng, W. S. A. Au, S. Valaee, and Z. Tan, "Received Signal Strength based Indoor Positioning using Compressive Sensing," Accepted by IEEE Transaction on Mobile Computing, 2011.

E. J. Candes and J. Romberg, "Sparsity and incoherence in compressive sampling," Inverse Problems, Nov. 2006.

E. J. Candes and T. Tao, "Near optimal signal recovery from randomm projections: Universal encoding strategies?" vol. 52, No. 12, pp. 5406-5425, Dec. 2006.

R.G. Baraniuk, M. A. Davenport, R. A. Devore, and M. B. Wakin, "A simple proof of the restricted isometry property for random matrices," Constructive Approximation, 2008.

\* cited by examiner

SYSTEM, METHOD AND COMPUTER PROGRAM FOR DYNAMIC GENERATION OF A RADIO MAP

PRIORITY CLAIM

This application claims the priority of U.S. Provisional Application 61/664,459 filed Jun. 26, 2012, the entire contents of which is hereby incorporated by reference.

FIELD

Embodiments described herein relate generally to determining a dynamic radio map. More particularly, embodiments described herein relate to a system, method and computer program for dynamic generation of a radio map based on sets of data elements, such as received signal strength (RSS) readings, for example. As an illustrative and non-limiting example, the dynamic radio map may be used for indoor positioning of one or more mobile devices. In some example embodiments, the system, method, and computer program may further involve determining the indoor positioning of a network of connected wireless mobile devices using the dynamic radio map.

INTRODUCTION

Recent advances in smart phones have made it feasible to provide indoor Location-Based Services (LBSs) utilizing low cost Wireless Local Area Network (WLAN) infrastructure technologies, such as indoor positioning, tracking, navigation, and location-based security. However, due to the relative complexity of indoor environments, it is usually difficult to provide a satisfactory level of accuracy for most locating applications. One of the key challenges that arise is how to design an accurate, real-time indoor positioning system that can be easily deployed on commercially available mobile devices without costly hardware installation or modifications.

Some effort has been directed to studying wireless localization with respect to Received Signal Strength (RSS) signals, such as is described in U.S. Publication No. U.S. 2013/0045750, for example. Compared with other measurement-based algorithms (e.g. time of-arrival (TOA) or angle-of-arrival (AOA) measurements of ultra-wideband (UWB) signals), RSS can be obtained by a WiFi-integrated mobile device.

Additional example techniques for wireless localization with respect to RSS to obtain the location estimate from the RSS are as follows:

Multilateration. As described in U.S. Publication No. 2013/0045750, RSS may be translated into distance from blind node to at least three particular reference nodes. The estimated location of the blind node is obtained through multilateration using the calculated estimated distances. However, in an indoor environment, the radio propagation channel may be unpredictable and time-varying, due to severe multipath, shadowing effects arising from reflection, refraction and scattering from obstacles and walls, and interference with other devices operated at the same frequency. Hence, the direct translation from RSS to distance for positioning limits the algorithm applied in complicated indoor environment such as shopping mall, hospital, etc.

Proximity. This method may find the strongest RSS from a specific reference point and determine the location of the blind node to be the region covered by this reference point. This method may only give a very rough position estimate, resulting large location ambiguity.

Scene Analysis. This method may first collect RSS readings at known positions, which are referred to as fingerprints, in the area of interest. Then, it may estimate the locations by comparing the online measurements with the fingerprints through pattern recognition techniques. However, pre-collecting fingerprints, known as an RSS radio map, a complete table of RSS readings at defined grid points on the map, is time consuming and involves an extensive labor cost, which largely limits service site.

Obtaining accurate RSS-based positioning may be a challenge because of inherent variations in RSS which may result from the dynamic and unpredictable nature of radio transmissions due to shadowing, multipath, interference, the orientation of wireless device, etc.

Alternative means of determining the location of a device, such as global positioning systems (GPS), may not provide an optimal foundation for indoor LBSs because of potential signal outages resulting from building structures, positional inaccuracies, and other technical problems due to signal interference which prevents effective location determination and tracking.

Certain mobile devices (such as those using the ANDROID™ operating system, for example) may be configured to enable the location determination of a mobile device through a network connection, but generally based on communication with a central server with which the mobile device checks in intermittently, providing current location information for the mobile device. However, many users may be concerned about the privacy implications of their movements being traced by a remote computer via their mobile devices. Furthermore, some privacy breaches caused by dealings between individuals and web companies have become highly publicized and have heightened concern around possible privacy implications of location based services in particular.

Therefore, what is required is an improved system and method for dynamic radio map generation for indoor positioning of mobile devices, and other applications.

SUMMARY

In a first aspect, embodiments described herein relate to a method of dynamically generating a radio map, the method involving configuring a processor to operate as a radio map generator; receiving, by the radio map generator, a plurality of sets of data elements; utilizing, by the radio map generator, a compressive sensing algorithm to learn, for each of the plurality of sets of data elements, at least a corresponding position using known pairs (set of data elements, position); and generating, by the radio map generator, a graph structure as a radio map using the sets of data elements and the corresponding positions.

In accordance with some embodiments, each set of data elements may represent a set of RSS readings with RSS readings from one or more signals emitted from one or more beacons.

In accordance with some embodiments, for each set of RSS readings, the method may involve selecting a subset of the one or more network access beacons.

In accordance with some embodiments, the corresponding positions are at least one of a two-dimensional position, a three-dimensional position, and a four-dimensional position.

In accordance with some embodiments, the known pairs are collected during fingerprinting.

In accordance with some embodiments, the method may further involve, for each of the plurality of sets of data elements, representing each corresponding position as a node on a connected graph; representing the known pairs as nodes on the connected graph; and generating, by the radio map generator, the graph structure using the connected graph.

In accordance with some embodiments, the method may further involve associating a weight with each pair of adjacent nodes in the connected graph, wherein the weight is a real non-negative number, and wherein the weight is determined by a measure of similarity of data elements.

In accordance with some embodiments, the connected graph has a sparse nature, and wherein the method further involves determining each weight as sparse signal recovery problem utilizing the compressive sensing algorithm.

In accordance with some embodiments, the method may further involve expressing the set of data elements for a node of the connected graph as an approximate linear combination of the sets of data elements for adjacent nodes.

In accordance with some embodiments, the method may further involve using a heat kernel function to compensate for error induced for incorrect adjacent nodes.

In accordance with some embodiments, the method may further involve predicting a location of nodes in the connected graph based on the known pairs.

In accordance with some embodiments, the method may further involve generating a user interface illustrating each corresponding position.

In accordance with some embodiments, the method may further involve determining the known pairs using a fingerprint database.

In accordance with some embodiments, a ratio of a number of sets of data elements to a number of known pairs is at least greater than 2, 3, 4, 5, 6, etc. There may be substantially more sets of data elements than known pairs.

In accordance with some embodiments, the method may further involve verifying the constructed graph structure for the radio map by comparing an actual pre-measured position with a predicated position based on the constructed graph structure for the radio map.

In accordance with some embodiments, each of the known pairs comprises a set of data elements and a corresponding position.

In accordance with some embodiments, the positions corresponding to the sets of data elements represent at least one of a product location, a child location, a consumer location, a medical patient location and a medical station location.

In accordance with some embodiments, the radio map represents at least one of an image library for a collection of images, an handwriting sample library for a collection of handwriting samples, a voice recognition library for a collection of speech samples, an image library for a collection of images, a genetic information classification library for a collection of genetic information records, a gaming element library for a collection of game elements, and an audio/visual content library for a collection of audio/visual content elements.

In accordance with some embodiments, the method may further involve incoherence and orthogonalization.

In accordance with some embodiments, the method may further involve minimization.

In accordance with some embodiments, the method may further involve clustering the one or more beacons.

In accordance with some embodiments, the method may further involve determining indoor positioning of a network of connected wireless mobile devices using the dynamic radio map.

In another aspect, embodiments described herein may provide a system of dynamically generating a radio map, having a processor configured to operate as a radio map generator, wherein the radio map generator receives a plurality of sets of data elements; utilizes a compressive sensing algorithm to learn, for each of the plurality of sets of data elements, at least a corresponding position using known pairs (set of data elements, position); and generates a graph structure as a radio map using the sets of data elements and the corresponding positions.

In accordance with some embodiments, each set of data elements represents a set of received signal strength (RSS) readings comprising RSS readings from one or more signals emitted from one or more beacons.

In accordance with some embodiments, at least some of the beacons are network access points.

In accordance with some embodiments, the radio map generator receives the sets of RSS readings from a plurality of mobile devices.

In accordance with some embodiments, the processor is disposed within at least one of a cell phone, a tablet, a vehicle, a medical device, and a server.

In accordance with some embodiments, the system may include a back end service that maintains and updates many radio maps for many locations.

In a further aspect, embodiments described herein may provide a computer-readable storage medium storing one or more sequences of instructions which, when executed by one or more processors, causes the one or more processors to perform a method of dynamically generating a radio map, the method involving configuring a processor to operate as a radio map generator; receiving, by the radio map generator, a plurality of sets of data elements; utilizing, by the radio map generator, a compressive sensing algorithm to learn, for each of the plurality of sets of data elements, at least a corresponding position using known pairs (set of data elements, position); and generating, by the radio map generator, a graph structure as a radio map using the sets of data elements and the corresponding positions.

In another aspect, embodiments described herein relate to systems, methods and computer programs for indoor positioning of devices that learn and generate an RSS radio map automatically and dynamically with only a small number of calibrations (e.g. fingerprints, known pairs of data elements) through semi-supervised learning and compressive sensing. Systems, methods and computer programs may then implement compressive sensing based localization and tracking for accurate indoor positioning in various indoor environments.

In a further aspect, embodiments described herein relate to a system, method and computer program for dynamic generation of a radio map for indoor positioning of one or more mobile devices based on RSS readings.

In an aspect, a dynamic scheme may be used to learn the RSS radio map from a small number of fingerprint samples (e.g. known pairs of data points and corresponding positions). Compressive sensing may be applied to build a graph structure and calculate the graph weight. Once the RSS radio map is learned, a wireless phone or other mobile device can be located and location based services can be provided to the user. An indoor learning and positioning system on a mobile device may be used to evaluate the performance. Experimental results indicate that the proposed system may not require a large amount of offline calibrations, reducing the labor cost of collecting fingerprints significantly while maintaining a satisfactory level of localization accuracy.

In a further aspect embodiments described herein may provide a method of dynamically generating a radio map, the method involving: receiving a plurality of RSS readings from a plurality of mobile devices; representing the plurality of RSS readings as nodes on a connected graph; and utilizing a compressive sensing algorithm to construct a graph structure for the radio map based on the RSS readings.

In some embodiments, the method may further involve utilizing a fingerprint database to determine the positions of the plurality of RSS readings; and labeling a subset of the determined positions of RSS readings for analysis as a sparse signal recovery problem utilizing the compressive sensing algorithm.

In some embodiments, the method may further involve predicting the location of nodes in the connected graph based on the determined positions of RSS readings.

In some embodiments, the method may further involve constructing the connected graph structure based on a graph weight calculated from the plurality of RSS readings.

In some embodiments, the method may further involve verifying the constructed graph structure for the radio map by comparing an actual pre-measured location with a predicated location based on the constructed graph structure for the radio map.

In another aspect embodiments described herein may provide system for dynamically generating a radio map, the system adapted to: receive a plurality of RSS readings from a plurality of mobile devices; represent the plurality of RSS readings as nodes on a connected graph; and utilize a compressive sensing algorithm to construct a graph structure for the radio map based on the RSS readings.

In some embodiments, the system may be further adapted to utilize a fingerprint database to determine the positions of the plurality of RSS readings; and label a subset of the determined positions of RSS readings for analysis as a sparse signal recover problem utilizing the compressive sensing algorithm.

In some embodiments, the system may be further adapted to predict the location of nodes in connected graph based on the determined positions of RSS readings.

In some embodiments, the system may be further adapted to construct the connected graph structure based on a graph weight calculated from the plurality of RSS readings.

In some embodiments, the system may be further adapted to verify the constructed graph structure for the radio map by comparing an actual pre-measured location with a predicated location based on the constructed graph structure for the radio map.

Other aspects, features, advantages, modifications and changes will become apparent, to those ordinarily skilled in the art, upon review of the following description of some exemplary embodiments. It should be understood, however, that the detailed description and specific examples are given by way of illustration and not limitation.

DESCRIPTION OF THE DRAWINGS

The invention will be better understood and objects of embodiments described herein will become apparent when consideration is given to the following detailed description thereof. Such description makes reference to the annexed drawings wherein.

Figure 1:
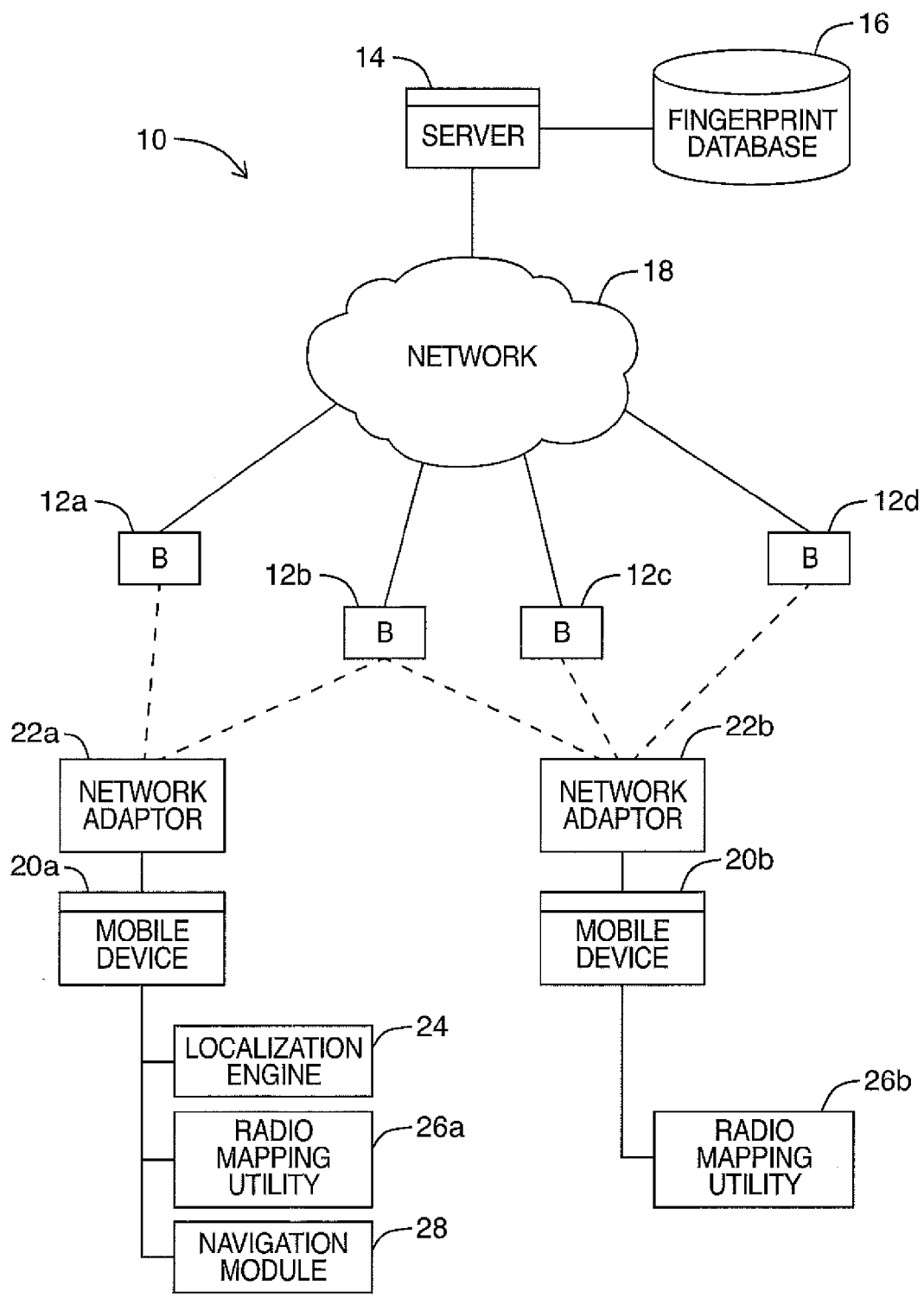
FIG. 1 illustrates an exemplary system in accordance with an embodiment.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

One should appreciate the disclosed radio map generation and positioning methods, algorithms, processes, or other types of location-based services can be embodied as a computer program product or application comprising a non-transitory computer readable media storing the instructions that cause a CPU/GPU processor on mobile devices to execute the disclosed steps.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that the embodiments described herein may be used to dynamically generate a radio map representing physical positions of devices within a defined geographic area in an efficient and cost effective manner. The dynamic radio map may be updated and may be used to track and locate the position of devices with the defined geographic area. The radio map may be constructed based on received readings representing signals from transmitting beacons. The radio map may be accurate and reduce errors in localization The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

As noted above, the present disclosure relates generally to a system, method and computer program for dynamic radio map generation for indoor positioning of one or more mobile devices, for example, smartphones, tables, medical carts, robots and other wearable devices such as Google glass, based on RSS readings or other sets of data elements.

In an aspect, the location of a mobile device can be determined based on RSS from one or more beacons and a radio map of the network generated by measuring RSS at a set of fingerprints (e.g. known pairs of data elements and positions). A set of fingerprints may be a finite set of reference points within the network area to be mapped. Beacons are configures to transmit a unidirectional signal to a mobile device, and in some examples may be adapted for a bi-directional data exchange between a device. A beacon may be a transmitter that emits a signal. A beacon may be also be a transceiver in some examples. An example beacon is an access point (AP). An AP may be considered an example beacon that also can receive signals. Other examples of beacons include IEEE 802.11 wireless access points, Bluetooth, Zigbee, WiGIG, WiFi Direct devices or even devices utilizing proprietary signals of non-standardized parts of the spectrum.

In another aspect, the mobile device may be adapted to measure RSS readings (or other data elements) and compare the measured RSS to the radio map for the network in order to determine its location without providing RSS measurements to a server or other third party, thus enabling anonymous location tracking. Furthermore, the location of the beacons does not need to be known in order to generate the radio map or determine the location of a mobile device.

In another aspect, an indoor positioning system learns and generates a radio map automatically and dynamically with a small number of calibrations (e.g. known pairs of data elements and positions) through semi-supervised learning and compressive sensing. For example, RSS measurements may be collected in large quantity simply by users carrying the mobile device and walking around the environment in normal course. The corresponding location in the radio map is learned from a constructed graph with a small number of fingerprint samples (e.g. known pairs of RSS readings and positions). A nonparametric approach is proposed to construct the graph from RSS measurements.

In another aspect, a dynamic scheme may be used to learn the RSS radio map from a small number of fingerprint samples. Compressive sensing may be applied to build the graph structure and calculate the graph weight. Once the RSS radio map is learned, a wireless phone can be located and location based services can be provided to the user. An indoor learning and positioning system on a mobile device may be used to evaluate the performance. Experimental results indicate that the proposed system does not require a large amount of offline calibrations, reducing the labor cost of collecting fingerprints significantly while maintaining a satisfactory level of localization accuracy.

In example embodiments, a graph weight finding problem may be formulated into a sparse signal recovery problem and thus according to compressive sensing, the graph weight can be estimated by solving an l1-minimization problem. In an illustrative embodiment, embodiments may be implemented on a mobile device (e.g. a smartphone such as an HTC Desire z or other manufacturer/make/model) and experimental tests may be run to evaluate the performance. Experimental results indicate that the proposed embodiments may not require a large amount of offline calibrations, reducing the labor cost of collecting fingerprints (e.g. known pairs) significantly, while maintaining a satisfactory level of localization accuracy. More generally, the learned RSS radio map may be used by any fingerprinting-based positioning system as an offline database, where online LBSs can be provided to the user.

An illustrative method in accordance with an embodiment comprises two phases: an offline phase for generating or reconstructing a radio map; and an online phase for location determination. A radio mapping utility (e.g. radio map generator) linked to a mobile device may implement the offline phase, while a location determination engine linked to the mobile device may implement the online phase.

In example embodiments, the radio mapping utility may generate the radio map by implementing a clustering technique, such as affinity propagation, followed by an outlier adjustment to address the effects of RSS variations. A compressive sensing (CS) algorithm may be used by the radio mapping utility to reconstruct the radio map based on RSS measurements at a subset of fingerprints, reducing the number of measurements significantly for updating the radio map from time-to-time.

In other embodiments, the location determination engine implements one or more algorithms to determine the location of the mobile device based on the RSS measured by the device. One such algorithm is the k-nearest neighbor (KNN) algorithm, which estimates the mobile device's location by computing a centroid of the k closest neighbors that have the smallest Euclidean distance with respect to the online RSS readings at the device. Another algorithm is a statistical method, in which the probability of each potential position is analyzed using Bayesian theory and kernel functions, assuming that RSS readings from different APs are independent at every instant in time. In comparison, a less computationally complex algorithm, which therefore enables real-time or near real-time performance, is a CS algorithm for recovering signals that are sparse or compressible under a certain basis, with far fewer noisy measurements than that needed by the Nyquist sampling theorem. The sparse signal can be reconstructed with high probability by solving an l1-minimization problem. Due to the sparse nature of location determination in the spatial domain, the CS algorithm, which offers deterministic recovery using a linear programming, is preferable.

In other embodiments, the online phase may be divided into two stages: (1) a coarse location determination stage to reduce the region of interest; and (2) a fine location determination stage to determine an accurate location. The use of two stage location determination may significantly reduce processing requirements, thereby enabling real-time or near real-time location determination of a mobile device. The location determination engine preferably implements a cluster matching algorithm in the coarse location determination stage and a compressive sensing algorithm in the fine location determination stage.

Additionally, past position estimates and motion dynamics may be used in the coarse location determination stage to more accurately reduce the region of interest. The motion dynamics can be modeled by a general Bayesian tracking model and a filter can then be derived to refine the position estimates. By assuming the Gaussian tracking noise model and linear motion dynamics, the general filter becomes a Kalman filter, whose optimal solution is a minimum mean square error (MMSE) estimate. Although the assumption of a Gaussian RSS-position relationship may sometimes not be possible, the application of the Kalman filter as the post-processing step is able to improve the accuracy of the positioning systems. The accuracy of the estimate can be improved further by using a particle filter. This filter can be applied on non-Gaussian and non-linear models and it can also be refined by additional information such as map, accelerometers, etc. Therefore, in the coarse location determination stage, the previous estimate may be used to select the nearby reference points, in addition to the clusters of reference points selected according to the online RSS readings. The tracking system may also implement the Kalman filter to smooth the estimate update.

Significantly, the location determination engine of the embodiments described herein is operable to provide relatively accurate location data associated with a mobile device, based on radio information derived from the mobile device only, without the need for information from a remote server tracking the location of the mobile device.

Illustrative embodiments will now be described with reference to the drawings.

FIG. 1 illustrates a system 10 in accordance with embodiments described herein. More generally, the system 10 may include one or more beacons 12 (e.g. network APs or other device adapted to transmit signals), and a network 18 accessible server 14 for administering a fingerprint database 16. In an embodiment, the fingerprint database 16 is linked to the server 14 for providing a radio map, and one or more mobile devices 20 are each operatively linked to a network adaptor 22 compatible with the network protocol implemented by the beacons 12 so as to receive a signal from the one or more beacons 12. For example, the beacons 12 may be IEEE 802.11 wireless access points and the network adaptors may be WLAN adaptors. This is a non-limiting example.

In an embodiment, the network beacons 12 may have known or unknown locations and may be associated with different networks 18. Each network beacon 12 emits a signal, and a radio map may be based on an RSS from the one or more network beacons 12 at one or more reference points.

In the present illustrative embodiment, each of the mobile devices 20 may further include or be linked to a location determination engine 24. The location determination engine 24 is operable to obtain the radio map or a subset thereof from the server 14, and to determine the location of the mobile device 20 based on the radio map and the RSS from the one or more beacons 12. The one or more mobile devices 20 may also be linked to a navigation module 28 for enabling a user of the mobile device 20 to provide initial set up, and to provide the user with path routing and tracking updates. One or more of the mobile devices 20 may further include or be linked to a radio mapping utility 26 (e.g. radio map generator). Alternatively, certain mobile devices 20 may be linked to a radio mapping utility 26 and used for generating the radio map, while other mobile devices 20 may be linked to a location determination engine 24 and used by users, for example.

For simplicity, the one or more mobile devices 20 will be referred to hereinafter as a single mobile device 20, linked to both the radio mapping utility 26 and the location determination engine 24. However, it will be understood that embodiments may be extended to determining the location of multiple mobile devices 20.

Mobile device 20 may obtain RSS readings and generate a dynamic radio using the radio mapping utility 26. The radio map may be then used to determine locations.

Mobile device 20 is operable by a user and may be any portable, networked (wired or wireless) computing device including a processor and memory and suitable for facilitating communication between one or more computing applications of mobile device 20 (e.g. a computing application installed on or running on the user device XX) and components of the system 10 such as the server 14.

In accordance with some embodiments, mobile device 20 may be a two-way communication device with advanced data communication capabilities having the capability to communicate with other computer systems and devices. Depending on the functionality provided by the mobile device, mobile device may be referred to as a portable electronic device, smartphone, a data messaging device, a two-way pager, a cellular telephone with data messaging capabilities, personal digital assistant, a wireless Internet appliance, a portable laptop computer, a tablet computer, medical devices, robots, wearable devices, a media player, an electronic reading device, a data communication device (with or without telephony capabilities) or a combination of these.

Mobile device 20 may include a processor configured with various computing applications such as a radio mapping utility 26. A computing application may correspond to hardware and software modules comprising computer executable instructions to configure physical hardware to perform various functions and discernible results. A computing application may be a computer software or hardware application designed to help the user to perform specific functions, and may include an application plug-in, a widget, instant messaging application, mobile device application, e-mail application, online telephony application, java application, web page, or web object residing, executing, running or rendered on the mobile device 20. Mobile devices 20 may be different types of devices and may serve one user or multiple users. Mobile device 20 may include one or more input devices, such as a keyboard, mouse, camera, touch screen and a microphone, and may also include one or more output devices such as a display screen and a speaker.

Server 14 may be implemented using a server and data storage devices configured with database(s) or file system(s) (e.g. fingerprint database 16) or using multiple servers or groups of servers distributed over a wide geographic area and connected via a network 18. Server 14 may be connected to a data storage device (e.g. fingerprint database 16) directly or via to a cloud based data storage device via network 18. Server 14 may reside on any networked computing device including a processor and memory, such as a personal computer, workstation, server, portable computer, mobile device, personal digital assistant, laptop, tablet, smart phone, WAP phone, an interactive television, video display terminals, gaming consoles, electronic reading device, and portable electronic devices, or a combination of these. Server 14 may include one or more microprocessors that may be any type of processor, such as, for example, any type of general-purpose microprocessor or microcontroller, a digital signal processing (DSP) processor, an integrated circuit, a programmable read-only memory (PROM), or any combination thereof. Server 14 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like. Server 14 may include one or more input devices, such as a keyboard, mouse, camera, touch screen and a microphone, and may also include one or more output devices such as a display screen and a speaker. Server 14 has a network interface in order to communicate with other components, to serve an application and other applications, and perform other computing applications by connecting to network 18 (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Although only one server 14 is shown for clarity, there may be multiple servers 14 or groups of servers 14 distributed over a wide geographic area and connected via e.g. network 18.

System 10 may include a back end service (not shown) that manages many radio maps for many locations. There may be many fingerprint databases 16 connected to the back end service. The back end service may provide an RSS-based location services infrastructure. The back end service may maintain and update many radio maps for many locations, such as those generated by different instances of radio mapping utility 26.

In an embodiment, a mobile device 20 may continuously or intermittently collect online RSS readings from each beacon 12 (that is within radio range of the mobile device) at a time interval $\Delta t$, which may be limited or dependent on the mobile device's 20 network adaptor 22 and computing performance, denoted as $r(t)=[r_1(t), r_2(t), \ldots, r_L(t)]$, $t=0, 1, 2$. The mobile device 20 then computes the estimated positions, denoted as $\hat{p}(t)=[\hat{x}(t),\hat{y}(t)]^T$, where superscript T denotes transposition.

During an initial offline phase 30 (FIG. 2), the time samples of RSS readings (e.g. sets of data elements) are collected at a plurality of reference points by pointing the mobile device 20 to different orientations (e.g., north, south, east, west). The raw set of RSS time samples collected from beacons 12 i at reference point j with orientation o is denoted as $\{\psi_{i,j}^{(o)}(\tau), \tau=1, \ldots, q, q>1\}$, with q as the total number of time samples collected. In some embodiments, the average of these time samples may be computed and stored in a database, which is referred to herein as example of the "radio map". The radio map gives a sufficient representation of the spatial RSS properties in the given region of interest, and can be represented by $\Psi^{(o)}$:

$$\Psi^{(o)} = \begin{pmatrix} \psi_{1,1}^{(o)} & \psi_{1,2}^{(o)} & \cdots & \psi_{1,N}^{(o)} \\ \psi_{2,1}^{(o)} & \psi_{2,2}^{(o)} & \cdots & \psi_{2,N}^{(o)} \\ \vdots & \vdots & \ddots & \vdots \\ \psi_{L,1}^{(o)} & \psi_{L,2}^{(o)} & \cdots & \psi_{L,N}^{(o)} \end{pmatrix} \quad (1)$$

where $$\psi_{i,j}^{(o)} = \frac{1}{q} \sum_{\tau=1}^{q} \psi_{i,j}^{(o)}(\tau)$$

is the average of RSS readings (in dBm scale) over time domain from beacon 12 i at reference point j with orientation o, for i=1, 2, ..., L, j=1, 2, ..., N, and o∈O={0°, 90°, 180°, 270°}. L is the total number of beacons 12 that can be detected, and N is the number of reference points. The columns of $\Psi^{(o)}$, radio map vectors, represent the RSS readings at each reference point with a particular orientation o, which can be referred to as $$\psi_j^{(o)} = [\psi_{1,j}^{(o)}, \psi_{2,j}^{(o)}, \ldots, \psi_{L,j}^{(o)}]^T, j=1,2,\ldots,N \quad (2)$$

where the superscript T denotes transposition.

In addition, the variances of these time samples may be stored. The variance vector for each reference point is defined as)

$$\Delta_j^{(o)} = [\Delta_{1,j}^{(o)}, \Delta_{2,j}^{(o)}, \ldots, \Delta_{L,j}^{(o)}]^T, j=1,2,\ldots,N \quad (3)$$

where $$\Delta_{i,j}^{(o)} = \frac{1}{q-1} \sum_{\tau=1}^{q} (\psi_{i,j}^{(o)}(\tau) - \psi_{i,j}^{(o)})^2$$

is the unbiased estimated variance of RSS readings from AP i at reference point j with orientation o.

The radio map is then the table $(x_j, y_j; \psi_j^{(o)}, \Delta_j^{(o)})$, j=1, ..., N, o∈O, where $(x_j, y_j)$ is the coordinates of the jth reference point. If no RSS reading is found for an AP at a reference point, the corresponding RSS entity in the radio map is set to a small value (in dBm scale) to imply its invalidity. In this example, the position corresponding to each set of is a two-dimensional position. In other examples, it may be three-dimensional position or a four-dimensional position (e.g. time, as the RSS averages may vary with time).

The reference points collected in the offline phase 30 may be divided into a number of clusters during clustering 32. Since the database at different orientations has a different set of RSS readings, the clustering 32 may be performed independently for each orientation. The affinity propagation algorithm may be used to generate the clusters, as it does not require initialization of exemplars in the traditional KNN clustering algorithm. Rather, the current affinity propagation considers all reference points equally as potential exemplars by assigning the same real number, known as preference, for each reference point as an input. Then, real-valued messages are recursively transmitted between pairs of reference points based on a measure of similarity, until exemplars and corresponding clusters are generated. The pair-wise similarity s(i, j)$^{(o)}$ indicates how well the reference point j is suited to be the exemplar for reference point i, which is defined as $$s(i,j)^{(o)} = -\|\psi_i^{(o)} - \psi_j^{(o)}\|^2$$

$$\forall i,j \in \{1,2,\ldots,N\}, j \neq i, o \in O \quad (4)$$

The self-similarity value s(j,j)$^{(o)}$, j=1, 2, ..., N, indicates the possibility that reference point j may become an exemplar. Since all the reference points are equally desirable to be exemplars, their preferences may be set to a common value. In order to generate a moderate number of clusters, the common preference for each orientation is defined as $$p^{(o)} = \gamma^{(o)} \cdot \text{median}\{s(i,j)^{(o)}, \forall i,j \in \{1,2,\ldots,N\}, j \neq i\} \quad (5)$$

where $\gamma^{(o)}$ is a real number which is experimentally determined, such that a desired number of clusters is generated.

In an embodiment, a core operation of the algorithm is the transmission of two kinds of real-valued messages between pairs of reference points. The responsibility message r(i,j)$^{(o)}$, sent from reference point i to candidate exemplar reference point j, is given by $$r(i,j)^{(o)} = s(i,j)^{(o)} - \max_{j' \neq j} \{a(i,j')^{(o)} + s(i,j')^{(o)}\} \quad (6)$$

where i≠j, and the availability message a(i,j)$^{(o)}$, sent from candidate exemplar reference point j to reference point i, is defined as $$a(i,j)^{(o)} = \min\left\{0, r(j,j)^{(o)} + \sum_{i' \neq i,j} \max\{0, r(i',j)^{(o)}\}\right\} \quad (7)$$

The messages may be passed recursively between pairs of reference points within each radio map and the above updating rules may be followed until a good set of exemplars and corresponding clusters emerges. The offline phase 30 may involve adjusting outliers 34 to address the effects of RSS variations.

The above process may be conducted after the fingerprints are collected during the offline phase 30. For each radio map with a particular orientation o, let H$^{(o)}$ be the set of exemplars; and for each reference point, j∈H$^{(o)}$, let C$_j^{(o)}$ denote the set of reference points for which reference point j is an exemplar. Each outlier, referred to as a reference point that is in the set of C$_j^{(o)}$ but physically far away from its exemplar j on the map, is further adjusted by assigning a new exemplar that is in its close proximity. Therefore, using the set of exemplars and their corresponding radio map vector, a coarse location determination stage may be provided to select the clusters that match the online RSS observations, and then the reference points of these candidate clusters may be used to localize the mobile device during the fine location determination stage.

Figure 2:
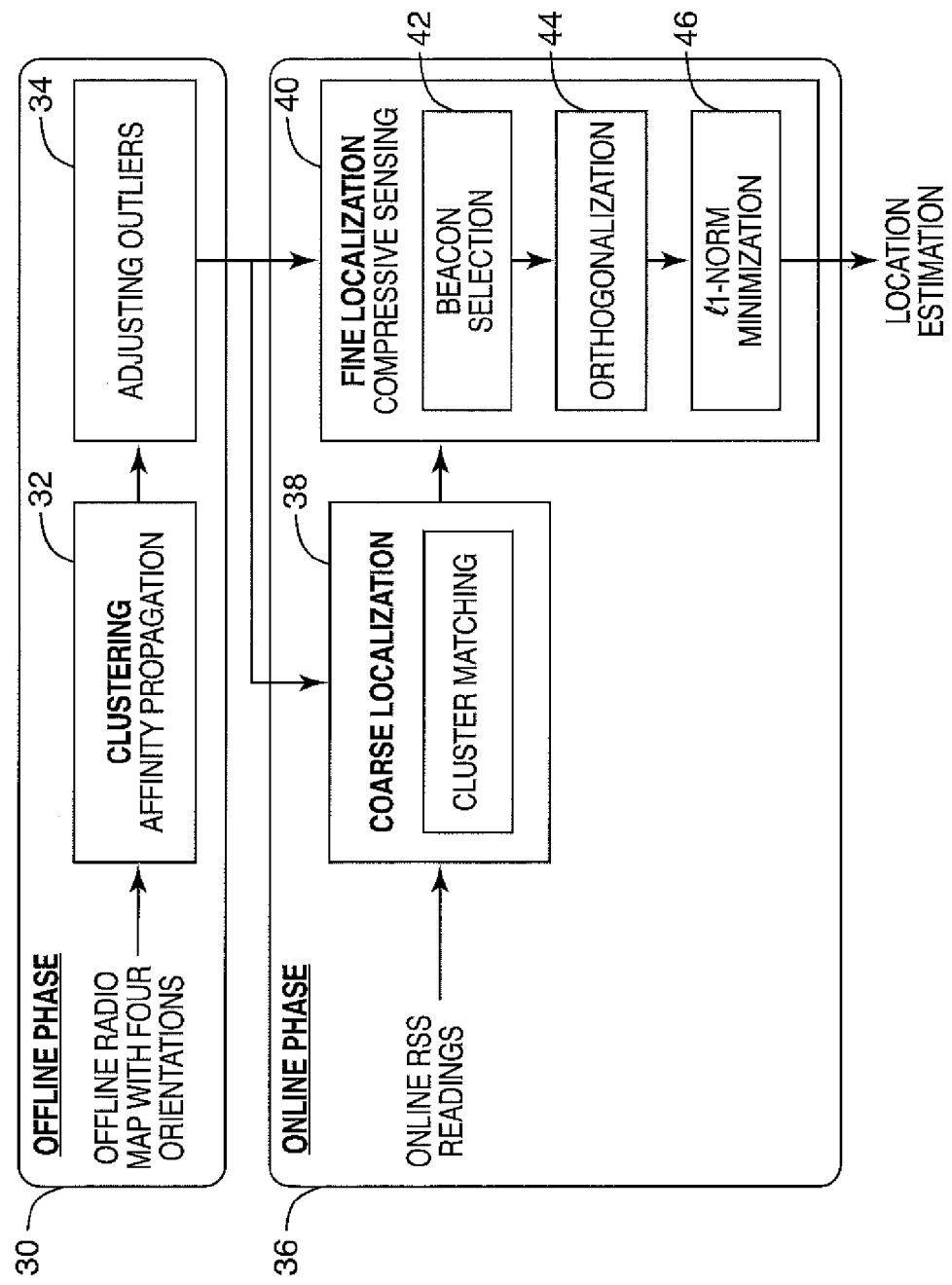
FIG. 2 illustrates a block diagram of an exemplary radio mapping utility (e.g. radio map generator) and location determination engine in accordance with an embodiment.

The actual location determination of the mobile device takes place in the online phase 36. During the online phase 36, an RSS measurement vector, denoted as $$\psi_r = [\psi_{1,r}, \ldots, \psi_{L,r}]^T \quad (8)$$

where $\{\psi_{k,r}, k=1, \ldots, L\}$, is collected by the mobile device pointed to an arbitrary orientation at unknown location. As shown in FIG. 2, there may be two stages in the online phase 36: (1) a coarse location determination stage 38 with cluster matching to reduce the area of interest; and (2) a fine location determination stage 40 with compressive sensing (CS) to recover the location estimation.

The goal of the coarse location determination stage 38 is to reduce the region of interest from the whole radio map to a subset thereof. Thus, it removes outliers, and reduces the complexity for the fine location determination stage 40, as fewer reference points are considered. Furthermore, it confines the maximum location determination error to the size of this subset, whereas this error can be much larger when no coarse location determination is implemented.

In an embodiment, the coarse location determination stage 38 is operated by comparing the similarity between the online RSS measurement vector and each exemplar to identify the cluster to which the online readings belong. Instead of selecting one cluster, a few best-matched exemplars S with their corresponding cluster member set C may be chosen to avoid the edge problem, which can lead to inaccurate estimation when the location of the mobile device is at the boundaries of clusters. Meanwhile, due to the time variation of the RSS, the online measurement can deviate from the values stored in the database.

Coarse location determination can be implemented using a cluster matching scheme, such as exemplar-based cluster matching, average RSS-based cluster matching, weighted cluster matching or strongest beacons 12 for cluster matching to define the appropriate similarity function. Then the clusters with the largest similarity values may be selected as the candidate clusters.

In exemplar-based cluster matching, similar to (4), above, the similarity function is defined as the negative of Euclidean distance of the online measurement vector $\psi_r$ to the individual exemplar's RSS radio map vector.

$$s(r,j)^{(o)} = -\|\psi_r - \psi_j^{(o)}\|^2, \forall j \in H^{(o)}, \forall o \in O \quad (9)$$

In average RSS-based cluster matching, instead of using the RSS radio map vector of each exemplar for cluster matching, the average of the RSS radio map vectors of all the cluster members is used to average out the possible RSS variations that come from a specific exemplar. It gives a more comprehensive and representative readings of the cluster. In this case, the Euclidean distance of the online measurement vector $\psi_r$ to the cluster with reference point j as its exemplar can be computed by $$s(r, j)^{(o)} = -\left\|\psi_r - \frac{1}{|C_j^{(o)}|}\sum_{k \in C_j^{(o)}} \psi_k^{(o)}\right\|^2, \quad (10)$$

$$\forall j \in H^{(o)}, \forall o \in O$$

where $|C_j^{(o)}|$ denotes the number of members in the cluster where reference point j is the exemplar.

In weighted cluster matching, since the variance of the RSS readings from each beacon 12 at each reference point is recorded during the offline phase 30, the stability of the RSS readings from a specific beacon 12 within a certain cluster can be considered as a weight for cluster matching. In weighted cluster matching, different weights are added to the above similarity function for each beacon 12, so that stable RSS readings have larger weights. The corresponding similarity function is defined as $$s(r, j)^{(o)} = -\left\|\omega_j^{(o)} \otimes \left(\psi_r - \frac{1}{|C_j^{(o)}|}\sum_{k \in C_j^{(o)}} \psi_k^{(o)}\right)\right\|^2 \quad (11)$$

$$\forall j \in H^{(o)}, \forall o \in O$$

where $\otimes$ is the element-wise multiplication between two vectors. $\omega_j^{(o)} = [\omega_{1,j}^{(o)}, \ldots, \omega_{l,j}^{(o)}, \ldots, \omega_{L,j}^{(o)}]^T, l \in \{1, \ldots, L\}$, where $\omega_{l,j}^{(o)}$ represents the weight for the RSS reading from AP l in the cluster j with orientation o, which is proportional to the inverse of the corresponding RSS variance, namely, $$\omega_{l,j}^{(o)} \propto \frac{1}{\overline{\Delta}_{l,j}^{(o)}}, \quad (12)$$

and $$\overline{\Delta}_{l,j}^{(o)} = \frac{1}{|C_j^{(o)}|}\sum_{k \in C_j^{(o)}} \Delta_{l,k}^{(o)}$$

The weights are normalized, so that $$\sum_{l=1}^{L} \omega_{l,j}^{(o)} = 1.$$

In an embodiment involving using the strongest beacons for cluster matching, as the strongest beacons provide the highest probability of the coverage over time, only the set of the beacons with the highest online RSS readings is selected. Thus, the similarity is calculated using any of the above schemes by only considering these selected beacons.

All of the above cluster matching schemes attempt to reduce the possibility of choosing the wrong cluster, which is the main source for the maximum location determination error.

The best-matched clusters can be found by using one or more of the above schemes. By evaluating the similarity function described above, the set of best-matched exemplars S with their corresponding cluster member set C can be found as $$S = \{(j, o): s(r, j)^{(o)} > \alpha, j \in H^{(o)}, \forall o \in O\} \quad (13)$$

$$C = \bigcup_{(j,o) \in S} C_j^{(o)} \quad (14)$$

where $\alpha$ is a pre-defined threshold to obtain a moderate number of clusters in S. Since only a small number of clusters is desired to be included in S, $\alpha$ may be set to be a percentage of the maximum similarity, that is $$\alpha = \alpha_1 \cdot \max_{j \in H^{(o)}, \forall o \in O}\{s(r, j)^{(o)}\} + \alpha_2 \cdot \min_{j \in H^{(o)}, \forall o \in O}\{s(r, j)^{(o)}\} \quad (15)$$

where $\alpha_1 + \alpha_2 = 1$, and $\alpha_1 = 0.95$ are possible examples of such settings.

After the coarse location determination, the set of interest can be reduced to the set C. The partial radio map matrix $\tilde{\Psi}_{L \times \tilde{N}}$, with $\tilde{N} = |C|$ can be obtained by $$\tilde{\Psi} = [\psi_j^{(o)}: \forall (j,o) \in C] \quad (16)$$

The matrix $\tilde{\Psi}$ will be used by the following fine location determination stage 40. Note that it is possible that more than two columns in $\tilde{\Psi}$ represent the same reference point but with different orientations, as all clusters from different orientations are considered for the cluster matching.

The location determination problem has a sparse nature, as the position of the mobile device 20 is unique in the discrete spatial domain at a certain time. Ideally, assuming that the mobile device 20 is located exactly at one of the reference points pointing at one of the orientations, the device's location can be formulated as a 1-sparse vector, denoted as $\theta$ (this assumption can be relaxed). Thus, $\theta$ is a $\tilde{N} \times 1$ vector with all elements equal to zero except $\theta(n)=1$, where n is the index of the reference point at which the mobile device is located, namely $$\theta = [0, \ldots, 0,1,0, \ldots, 0]^T. \tag{17}$$

Then, the online RSS reading measured by the mobile device can be expressed as $$y = \Phi \tilde{\Psi} \theta + \epsilon \tag{18}$$

where $\tilde{\Psi}$ is the partial radio map matrix as defined in (16), and $\epsilon$ is an unknown measurement noise that comes from RSS deviations. The M×L matrix $\Phi$ is an beacon selection operator applied on the online RSS measurement vector $\psi_r$, such that $$y = \Phi \psi_r \tag{19}$$

In an illustrative implementation, with wide deployment of beacons 12, the total number of detectable beacons 12 is generally much greater than that required for positioning, which leads to redundant computations. Furthermore, unreliable beacons 12 with large RSS variances may also lead to biased estimation and affect the stability of the positioning system. This motivates the use of beacons selection 42 techniques to select a subset of available beacons 12 for positioning. Different beacon selection 42 schemes can be used to increase the accuracy of the fine location determination stage 40.

According to (1), the set of beacons 12 covering the reference points can be denoted as L, with |L|=L. The objective of beacon selection 42 is to determine a set M⊆L such that |M|=M≤L. This process is carried out by using the beacon selection 42 matrix $\Phi$. Each row of $\Phi$ is a 1×L vector with all elements equal to zero except $\phi(l)=1$, where l is the index of the beacon 12 that is selected for positioning:

$$\phi_m = [0, \ldots, 0,1,0, \ldots, 0], \forall m \in \{1, 2, \ldots, M\} \tag{20}$$

Different approaches can be used to determine the matrix $\Phi$, including strongest beacons 12, Fisher criterion and random combination.

For the strongest beacons 12 approach, similar to the coarse location determination, the set of APs with the highest RSS readings is selected based on the rationale that the strongest beacons 12 provide the highest probability of coverage over time. Here, the measurement vector (8) is sorted in the decreasing order of RSS readings, and the APs corresponding to the least indices are used. Since $\Phi$ is created based on the current online measurement vector, this criterion may create different $\Phi$ for each location update.

In an embodiment, the Fisher criterion is used to quantify the discrimination ability for each beacon 12 across reference points over four orientations. By comparing the metric $\xi_i, \forall i \in \{1, \ldots, L\}$, defined as $$\xi_i = \frac{\sum_{(j,o) \in C} (\psi_{i,j}^{(o)} - \bar{\psi}_i)^2}{\sum_{(j,o) \in C} (\Delta_{i,j}^{(o)})} \tag{21}$$

where $$\bar{\psi}_i = \frac{1}{\tilde{N}} \sum_{(j,o) \in C} \psi_{i,j}^{(o)}.$$

The denominator of $\xi_i$ ensures that RSS values do not vary much over time so that the offline and online values are similar; while the numerator represents the discrimination ability of each beacon 12 by evaluating the strength of variations of mean RSS across reference points. The beacons 12 with the highest $\xi_i$ are selected to construct the matrix $\Phi$ for the fine location determination.

In a random combination, unlike the above two schemes, which select the appropriate beacons 12 based on different criteria and create the matrix $\Phi$ dynamically for each location update, the AP selection operator $\Phi$ is defined as a random M×L matrix with i.i.d Gaussian entries. The random combination scheme has less computational complexity, as the matrix is fixed at different runs, and it does not require as much RSS time samples to calculate the variance as required by the Fisher criterion.

Besides sparsity in (18), incoherence is another important property that should be satisfied to enable the use of the CS theory. However, $\Phi$ (generated by either the strongest APs or the Fisher criterion) and $\tilde{\Psi}$ are in general coherent in the spatial domain, which violates the incoherence requirement for the CS theory. To address this, the following orthogonalization pre-processing procedure 44 restores such a property.

Define an orthogonalization operator T as $$T = QR^\dagger \tag{22}$$

where $R = \Phi \tilde{\Psi}$, and $Q = \text{orth}(R^T)^T$, where orth(R) is an orthogonal basis for the range of R, and $R^\dagger$ is a pseudo-inverse of matrix R.

The orthogonalization process 44 is done by applying the operator T on the measurement vector y, such that $$z = Ty = QR^\dagger R \theta + \epsilon' \tag{23}$$

where $\epsilon' = T\epsilon$. It is straightforward to show that $QR^\dagger R = Q$. Therefore, the location determination problem formulated in (18) can be reformulated as $$z = Q\theta + \epsilon'. \tag{24}$$

Here Q is a row orthogonal matrix with unit norm. It has been proved that Q obeys the Restricted Isomatry Property (RIP) that is needed by the CS. Since $\theta$ has a sparse nature, according to the theory of compressive sensing, if the number of beacons 12 M is in the order of $\log(\tilde{N})$, the location indicator $\theta$ can be well recovered from z with very high probability, by solving the following $l_1$-minimization problem (e.g. a minimization process 46).

$$\hat{\theta} = \underset{\theta \in R^{\tilde{N}}}{\text{argmin}} \|\theta\|_1, \text{ s.t., } z = Q\theta + \epsilon'. \tag{25}$$

where $\|\cdot\|_1$ is the $l_1$-norm of a vector.

On a special note, the complexity of the $l_1$-minimization algorithm grows proportional to the dimension of vector θ, which represents the number of potential reference points. Therefore, the coarse location determination stage 38, which reduces the area of interest from all the N reference points into a subset of Ñ reference points (Ñ<<N), reduces the computational time for solving the $l_1$-minimization problem and thus, allows this procedure to be carried out by resource-limited mobile devices 20.

If the mobile device 20 is located at one of the reference points pointing at one of the measured orientations, the recovered position is almost exact. However, in a more likely scenario, the mobile device 20 may not be exactly located at a certain reference point facing a certain orientation. In such cases, the recovered location $\hat{\theta}$ is not an exact 1-sparse vector, but includes a few non-zero coefficients. In order to compensate for the error induced by the grid assumption, a post-processing procedure is conducted. It is preferable to choose the dominant coefficients in $\hat{\theta}$ whose values are above a certain threshold λ, and take the normalized value in $\hat{\theta}$ as the corresponding weight for each potential reference point to calculate the location estimation. Let R be the set of all indices of the elements of $\hat{\theta}$ such that $$R = \{n | \hat{\theta}(n) > \lambda\}. \quad (26)$$

The location of the mobile device 20 can be estimated by a weighted linear combination of these candidate points, which is $$(\hat{x}, \hat{y}) = \frac{1}{\sum_{n \in R} \hat{\theta}(n)} \sum_{n \in R} \hat{\theta}(n) \cdot (x_n, y_n). \quad (27)$$

In an illustrative implementation, the radio map may need to be updated if the surrounding environment changes significantly. This may be done by following a radio map update procedure. Specifically, let vector $r_i$ represent the RSS readings from AP i over the reference points that cover the experimental area, which is also the transpose of the ith row of the RSS radio map database defined in (1). Let F denote the linear operator that transforms the $r_i$ from the pixel representation in the spatial domain into the sparse representation in the frequency domain, namely, $$x = F \cdot r_i \quad (28)$$

Further define a sampling matrix $G_{M \times N}$. Each row of G is a 1×N vector with all elements equal to zero except g(n)=1 where n is the index of the reference point that is measured on the radio map by the mobile device during the offline phase. The measured reference points are randomly selected.

Therefore, the offline RSS vector from a certain AP measured by the mobile device can be expressed as:

$$m = G r_i = G F^{-1} x = R x \quad (29)$$

Since x has a sparse feature, with the similar orthogonalization procedure 44 in (23), namely, z=Tm, the radio map can be reconstructed by solving the following $l_1$-minimization problem. Here, total variation minimization, a special case of the $l_1$-minimization, can be used to solve the sparse signal recovery problem, as it may be used for 2D image recovery.

$$\hat{x} = \underset{x}{\operatorname{argmin}} \|\nabla (x)\|_1, \text{ s.t., } z = Qx + \varepsilon \quad (30)$$

where $\|\nabla(x)\|_1$, defined as the total variation of x, is the sum of the magnitudes of the gradient at every point, and ϵ is the measurement noise.

Finally, the reconstructed RSS radio map from beacon 12 i over the area of interest can be obtained by $$r_i = F^{-1} x \quad (31)$$

The radio map from the rest of the beacons 12 can be recovered using the same approach. Therefore, RSS is measured on a small number of grid points and (30) is used to reconstruct the radio map on the whole grid. Since the number of measurements (M) needed for the radio map recovery obeys O(k log(N)), where N is the total number of reference points, and k indicates the sparsity level of signal x, significant reduction in the number of measured reference points can be expected.

The CS-based positioning system can be extended as a tracking system, which improves the accuracy in estimating the mobile device's 20 locations. By using the mobile device's 20 previous estimated locations, the tracking system is able to refine the current estimate in two ways: 1) to select appropriate reference points in the coarse location determination stage and 2) to apply Kalman filter for better location estimate. Map information is used to determine how the Kalman filter is updated to find the location. A modified coarse location determination stage 38 chooses the relevant reference points based on two criteria: (1) online RSS readings; and (2) physical proximity of previous estimate.

The location determination engine 24 first selects the clusters of reference points defined in the offline stage that have similar RSS reading patterns to the online RSS vector r(t). This cluster matching process 32 may be as previously described. The location determination engine 24 then compares the online RSS readings to the averaged RSS readings of the reference points from the same cluster to select the best-matched clusters of reference points, which are denoted as a set $C_{RSS}$.

Besides the use of the online RSS readings to choose the relevant reference points, reference points can be chosen by finding the possible range of the device's current location based on the previous estimated location, $\hat{p}(t-1) = [\hat{x}(t-1), \hat{y}(t-1)]^T$. In a localized application, since a person normally cannot walk far away with a mobile device 20 within a short period of time, it is reasonable that the system limit the region of interest into a possible walking range from the previous estimated position, if it is known and reliable. There are two schemes to choose this possible walking range, unpredicted scheme and predicted scheme.

The unpredicted scheme selects the reference points which are within walking distance during the specified update time interval to the previous estimated location, that is $$C_{Dist} = \{j | \sqrt{(x_j - \hat{x}(t-1))^2 + (y_j - \hat{y}(t-1))^2} < \beta, j \in 1, \ldots, N\} \quad (32)$$

where β is the walking distance within the specified update time interval Δt.

The predicted scheme uses the previous estimated location to predict the current possible location based on a linear motion model and then chooses the reference points which are within the walking range of this predicted position. The state vector of this linear model contains the position and velocity of the mobile device, i.e. $\hat{x}(t) = [\hat{x}(t), \hat{y}(t), v_x(t), v_y(t)]^T$ with $v_x(t)$ and $v_y(t)$ as the velocities in x and y direction at time t respectively. Then, the model is defined as $$\hat{x}(t) = F\hat{x}(t-1) \quad (33)$$

$$z(t) = H\hat{x}(t) \quad (34)$$

with $$F = \begin{pmatrix} 1 & 0 & \Delta t & 0 \\ 0 & 1 & 0 & \Delta t \\ 0 & 0 & 1 & 0 \\ 0 & 0 & 0 & 1 \end{pmatrix}, \quad H = \begin{pmatrix} 1 & 0 & 0 & 0 \\ 0 & 1 & 0 & 0 \end{pmatrix} \quad (35)$$

where z(t) is the predicted current location. The estimation of the unknown velocities, $v_x(t)$ and $v_y(t)$ can be obtained from the output of the Kalman filter based on the same linear model (33) in addition to Gaussian noises, which is implemented after the fine location determination stage. The implementation of the Kalman filter is described above.

The location determination engine 24 then selects a set of reference points, $C_{Dist}$, which are in close proximity to the predicted current location, z(t), according to (32), where z(t) is used instead of $\hat{p}(t-1)$.

After the selection of these two groups of relevant reference points based on RSS readings similarities and physical proximities, the location determination engine 24 includes the common reference points that appear in both groups as the set of reduced region, where the final location determination stage is then applied. The common reference points are obtained as a set C, $$C = C_{RSS} \cap \{(j,o)|j \in C_{Dist} \text{ and } o \in O\} \quad (36)$$

This set contains reference points that satisfy both conditions of similar RSS readings to the online RSS measurement and within close range to the mobile device's previous location. Thus, they are very likely to be the possible locations at which the mobile device 20 is located. By introducing the constraint of physical range, the location determination engine is able to identify the instant when the online RSS readings collected is not useful to find the mobile device's 20 position. In normal operation, the mobile device 20 is assumed to be within a defined range around its previous location. If the selected clusters of reference points in $C_{RSS}$ are far away from the previous location, then the online RSS readings can be regarded as invalid, as there are large deviations between the online readings and offline database, so that the cluster matching based on similarities of RSS readings fails to find the correct clusters of reference points. This scenario leads to an empty set of C and halts the fine location determination stage. If such thing occurs, the location determination engine discards this online RSS measurement vector and obtains a new one to restart the location determination process.

There may be a possibility that all the consecutive online RSS measurement vectors lead to empty sets of C. This makes the location determination engine continuously collect a new online RSS measurement, which is then discarded, preventing it from computing the true estimate of the mobile device's 20 location. This happens as the previous position estimate is not accurate and hence the selection of reference points based on such estimate does not match with the reference points selected based on the online RSS measurement vector. Thus, the location determination engine 24 only uses the online RSS measurement vector to select the reference points, when $N_{empty}$ consecutive online RSS measurement vectors are discarded, arguing that the previous position estimate is no longer valid to reduce the location determination problem into a smaller relevant region.

In an embodiment, a Kalman Filter may be applied on the location estimate computed in the fine location determination stage to enhance the tracking performance. By adding Gaussian noises to the linear motion models as described in (37), the Kalman tracking model is formulated as $$x(t) = Fx(t-1) + \omega(t) \quad (37)$$

$$z(t) = Hx(t) + v(t) \quad (38)$$

The process noise $\omega(t) \sim N(0,P)$ and the measurement noise $v(t) \sim N(0,U)$ are assumed to be independent with the corresponding covariance matrices P and U.

The steps to obtain the final estimates of state vector $\hat{x}(t)$ and the error covariance P(t) include prediction and update.

In prediction, $$\hat{x}^-(t) = F\hat{x}(t-1) \quad (39)$$

$$P^-(t) = FP(t-1)F^T + Q \quad (40)$$

In update, $$K(t) = P^-(t)H^T(HP^-(t)H^T + R)^{-1} \quad (41)$$

$$\hat{x}(t) = \hat{x}^-(t) + K(t)(z(t) - H\hat{x}^-(t)) \quad (42)$$

$$P(t) = (I - K(t)H)P^-(t) \quad (43)$$

Note that the observation z(t) in (42) is the estimation of position computed by the fine location determination stage, i.e. $Z(t) = \tilde{p}(t)$. After the computation of the state vector, the final estimate of the mobile device's location can be found as $\hat{p}(t) = H\hat{x}(t)$.

In an illustrative example of a real world situation, the Kalman filter is able to enhance the tracking performance when the user with a mobile device is walking along a corridor inside a building, as the linear motion assumed by the filter is sufficient to model the user's trajectory. However, when user is making a turn at an intersection, the linear model does not apply to this behavior which involves abrupt change in direction. Hence the Kalman filter may require several more updates to reflect the user's true trajectory and thus leads to more errors in position estimate.

By using the map information, the Kalman filter can be modified to follow the user's trajectory more closely. Since the Kalman filter behaves the best when the user with the mobile device 20 is walking straight along a corridor but performs poorly around the intersections, the Kalman filter is reset when the user is in the region of intersection. According to the map, a region of intersection i can be identified as a non-rotated bounding box with $(x_{min}^i, y_{min}^i)$ and $(x_{max}^i, y_{max}^i)$ as the lower-left and upper-right corners respectively. Thus, the user is within the intersection region at time $t_{turn}$ if the below two conditions are satisfied:

$$x_{min}^i \leq \hat{x}(t_{turn}) \leq x_{max}^i, y_{min}^i \leq \hat{y}(t_{turn}) \leq y_{max}^i \quad (44)$$

Then, the Kalman filter is reset by reassigning the initial condition of Kalman filter $x(t_{turn}) = [\hat{p}(t_{turn}), 0, 0]^T$ and $P(t_{turn}) = P(0)$ and the Kalman filter is updated as normal according to (39) to (43) for the next estimate using $z(t_{turn}+1) = \tilde{p}(t_{turn}+1)$ This removes the inaccurate estimation by Kalman filter when the user is making a turn.

The mobile device 20 may further be linked to a navigation module 28 to provide guidance to the mobile user to reach his desired destination. The navigation module 28 may enable: 1) initial setup, 2) path routing and 3) tracking update.

The navigation module 28 depends on the radio map of the region of interest, which shows the layout of different features such as rooms, corridors and elevators etc. During the setup stage, information about different map features are extracted from the map, in order to let the navigation system to generate a feasible path and descriptive instructions about the surrounding environment.

First, the layout of the map may be interpreted as a graph with nodes, which are a set of Cartesian coordinates of the possible passage points along the corridors or destinations and edges between nodes that means they can reach each other physically. Each edge may be assigned with a non-negative weight, which is defined as the Euclidean distance between two connected nodes. This connected graph is used by the system to generate the desired path for path routing. In addition to the definition of this connected graph, a list of map features is recorded along with their locations, so that the navigation system can generate instructions based on these features.

At the beginning of the navigation, the mobile device 20 first obtains the user's input of desired destination and user's current location, which can be either specified by the user or estimated by the device using the location determination engine. Then, the system identifies the two nodes on the connected graph, predefined during initial setup, that are closest to the destination and user's current location, respectively. Path routing may be interpreted as finding the shortest path between these two nodes on the connected graph. This problem can be solved by applying the Dijkstra algorithm.

The generated path can be divided into series of line segments that are oriented at different directions. The generated path can be denoted as a set of line segments $G=\{l_1, l_2, \ldots, l_S\}$, where S is the number of line segments and each segment is denoted as $l_i=\{p_s^i, p_e^i\}$, where $p_s^i=\{x_s^i, y_s^i\}$ and $p_e^i=\{x_e^i, y_e^i\}$ are the starting and ending points of the ith line segment respectively. The turning points are identified as the ending points between line segments, that is $T=\{p_e^i | i=1, \ldots, S-1\}$. Based on these generated line segments, the system is able to determine the turning points, the direction of turns and the distance traveled at each line segments. In addition, the system can also find out the list of relevant map features appeared along this generated path denoted as $F=\{p_f^j, \text{Feature}_j | j=1, \ldots, C\}$, where $p_f^j=\{x_f^j, y_f^j\}$ is the location of feature j and Feature$_j$ is the feature's name and C is the total number of relevant map features.

Figure 3:
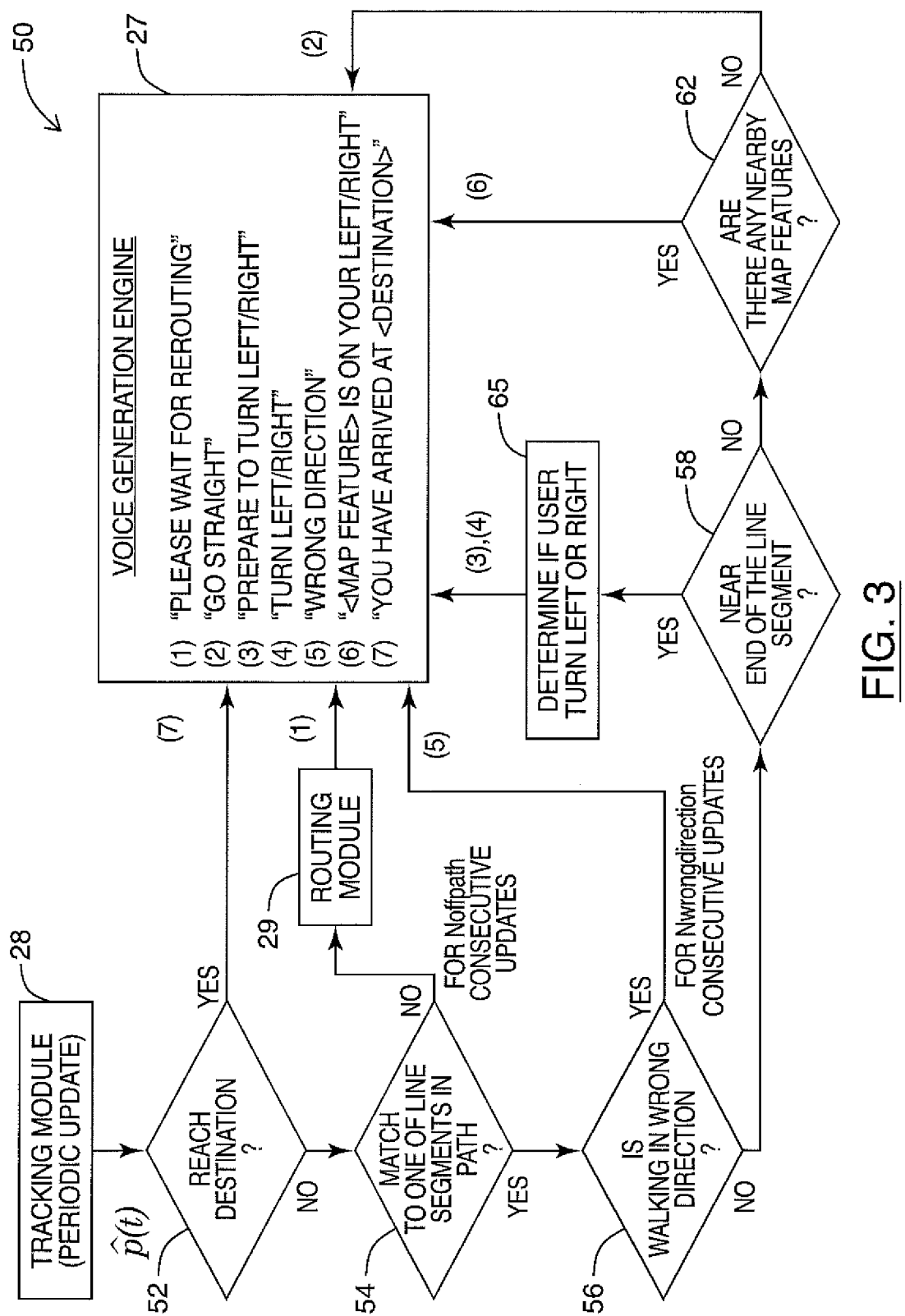
FIG. 3 illustrates a tracking update analysis procedure in accordance with an embodiment.

After the generation of the path that can lead the user to his targets, the navigation module 28 begins tracking updates to keep track of user's position. For each tracking update, the navigation module compares the location estimate to the routed path to check if the user follows the path properly. The analysis is done according to the process 50 FIG. 3.

Figure 4:
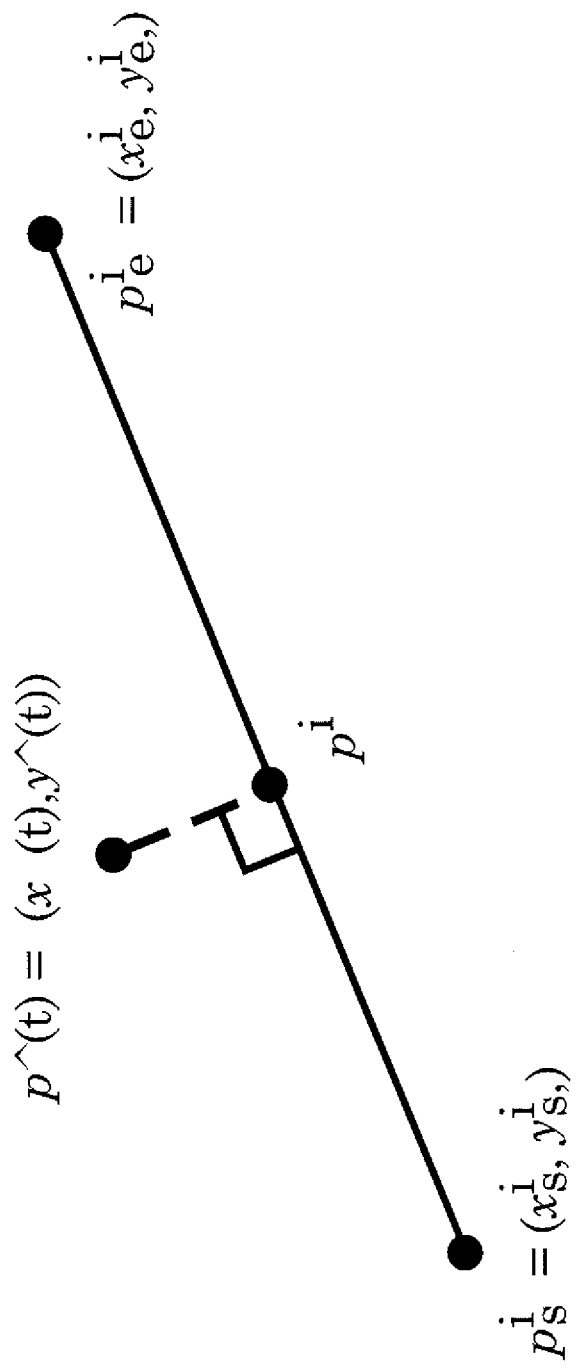
FIG. 4 illustrates a point in close range to a line segment.

At 52, the navigation module 28 (which may be referred to as a tracking module) first determines if the user reaches the destination by checking the Euclidean distance between the user's current position and the target being within a range $\beta_{destination}$. Otherwise, at 54, the navigation module 28 attempts to match the user's current position $\hat{p}(t)$ to one of the line segments in the generated path set G. If this tracking update is within a line segment, $l_i$ as illustrated in FIG. 4, then the navigation module 28 can find the projection and the minimum distance of the tracking update point $\hat{p}(t)$ to the line segment $l_i$ with $p_s^i$ and $p_e^i$ by solving the two equations:

$$p^i = p_s^i + \mu_i(p_e^i - p_s^i) \tag{45}$$

$$(\hat{p}(t) - p^i)(p_e^i - p_s^i) = 0 \tag{46}$$

where $p^i$ is the projected point which is collinear $p_s^i$ and $p_e^i$ and $\mu$ is the ratio in terms of the distance between $p_s^i$ and $p_e^i$ indicating how far the point $p^i$ is away from $p_s^i$. The solution to $\mu_i$ from (45) is $$\mu_i = \frac{(\hat{p}(t) - p_s^i)(p_e^i - p_s^i)}{\|p_s^i - p_e^i\|^2} \tag{47}$$

If the computed $\mu_i$ is within a range of [0, 1], then the projected point falls onto the line segment, which means the update estimate is within the range of this line segment. By substituting (47) into (45), the projected point p can be computed and the shortest distance of the tracking update point to the line segment can be obtained as $d_{min}^i = \|\hat{p}(t) - p^i\|$. Hence, the navigation module 28 determines that the tracking estimate matches the line segment $l_i$ if i) $\mu_i \in [0,1]_{[0, 1]}$ and ii) $d_{min}^i < \beta_{path}$. If there are consecutively $N_{offpath}$ tracking estimates failing to match with any of the line segments in G, then the navigation module 28 can prompt the user (via voice generation engine 27 and routing module 29) to stop moving and do the path rerouting following the same procedure described above using user's current position as the starting point.

At 56, navigation module determines whether the user is walking in the wrong direction.

In addition, if the value of $\mu$ is close to one, which means the user is close to the end of the line segment (as determined at 58), then the navigation module 28 can identify that the user is required to turn (at 65) and give appropriate instructions (via voice generation engine 27). Note that, in normal situation, where the user follows the path correctly, the value of $\mu$ should increase along the same line segment for each update and eventually move to the next segment. The direction of turn can then be computed based on the current and next line segments' directions.

To determine the orientation of the mobile user, for each tracking update, a direction vector is computed between the current update and the previous one and then is compared with the currently matched line segment direction. If consecutive $N_{Wrong\ direction}$ tracking updates are in opposite direction of the line segment, then a voice command of wrong direction may be issued to the user (via voice generation engine 27).

Finally, the navigation module computes the Euclidean distance between the user's current estimate $\hat{p}(t)$ to the map features in F (at 62). If the distance is smaller than $\beta_f$, then the module will generate the corresponding voice command regarding this specific map features to the user (via voice generation engine 27).

Use Cases

Embodiments described herein can be applied to a plurality of indoor and outdoor applications.

For example, the embodiments described herein can be used to augment current location-based services that are operable outdoors (for example, by use of GPS) but lose functionality indoors. Augmenting outdoor location-based services could be advantageous by providing users the ability to receive path routing within a building from an external origin. It could further be used to enhance emergency services by providing precise locations of emergency situations. Advertisers could also extend advertising to a more precise location to enhance behavioral marketing.

Another application of the embodiments described herein is to enable data sharing between mobile devices 20 within close proximity. Potential applications include file (photos and other media) sharing, document exchange and social introductions.

Further applications include enabling precise location determination of a user within a blueprint provided by the radio map. For example, a user could use a mobile device 20 to navigate a shopping mall that has a radio map augmented with location information including store locations, department locations within a store, sections with a department, and even product placement within a section. For example, the constructed graph can be created in a manner where nodes are bound to store shelves or product locations. Conversely, the embodiments described herein could be used to monitor/track the location of a child or adult in a busy mall setting. Additional applications include medical devices, educational institutions (e.g. museums, galleries), social interactions (proximity detection), travel, shopping, gaming, sporting events, etc. For example, in a medical environment, medical devices may leverage radio maps.

Similarly, the embodiments described herein could be used to index and remember the location of parking a user's car in an indoor parking garage; locate services (bathrooms, restaurants, boarding gates, etc.) in an airport, conference center, theme park, hotel or other large or unfamiliar facility; and track locations of assets by placing a fingerprint at the asset location. Asset location tracking could be beneficial, for example, for enabling delivery companies to quickly and precisely locate a delivery point.

The embodiments described herein could further be used as input to a mobile utility that is location based. For example, in an indoor location that has contextual feedback at a given location, the invention could provide the prompt necessary for the feedback to be provided to a user. In a specific example, a user could be in a museum that has a mobile application providing information regarding the museum artifacts. When the user is in the vicinity of an artifact, the corresponding information can be automatically provided to the user via the user's mobile device. This could also be used at a site auction, for example, where information on the sale items could be presented to users based on the user being in proximity of the sale items. It could also be used in real estate sales, where owners could set up information to be presented for specific portions (e.g., rooms, views, etc.) of the real estate.

Further applications include enabling precise location determination of a user within a blueprint provided by the radio map. For example, a user could use a mobile device to navigate a shopping mall that has a radio map augmented with location information including store locations, department locations within a store, sections with a department, and even product placement within a section. Location-based services such as store promotions, coupons, new product descriptions can be delivered to the mobile device when the user is in the close proximity of the store. Conversely, the invention could be used to monitor/track the location of a child or adult in a busy mall setting.

For example, the disclosed approach can be used within an augmented reality gaming environment, possibly an augmented reality form of laser tag. The arena can be instrumented with beacons and players can then be tracked. Extension to the technology can include creating "jammers" that prevent location determination of players, or increases location errors to confound opponents.

Example #1

Real data were obtained from an office building. Specifically, the experiments were carried out on a 30 m×46 m area of the fourth floor of an eight-story building (Bahen Center at the University of Toronto). A total of 26 beacons 12 were detected throughout the area of interest.

A personal digital assistant (PDA) or mobile device (HP iPAQ hx4700 with Windows Mobile 2003 pocket PC) was used to measure WLAN signal strength value, and a software was developed in Visual Studio C# to implement the CS-based positioning system on the device. The RSS values were collected on the device by using the open source library OpenNetCF, which provides access to MAC address and RSS values of WLAN APs. During the offline phase, the RSS observations from 26 beacons 12 were recorded for a period of 50 seconds (one sample per second) over 72 reference points with an average grid spacing of 1.5 m. At each reference point, RSS values from four orientations were recorded. The online observations were collected on a different day by the device at unknown locations as the testing points to evaluate the actual performance of the system under time-varying environment. Each online observation is an average of 2 RSS time samples, which takes 2 seconds for Wi-Fi scanning on the device.

In the following, the location determination error, which is measured by averaging the Euclidean distance between the estimated locations of the mobile user and the actual location over the testing points, has been reported as the performance measure.

Figure 5:
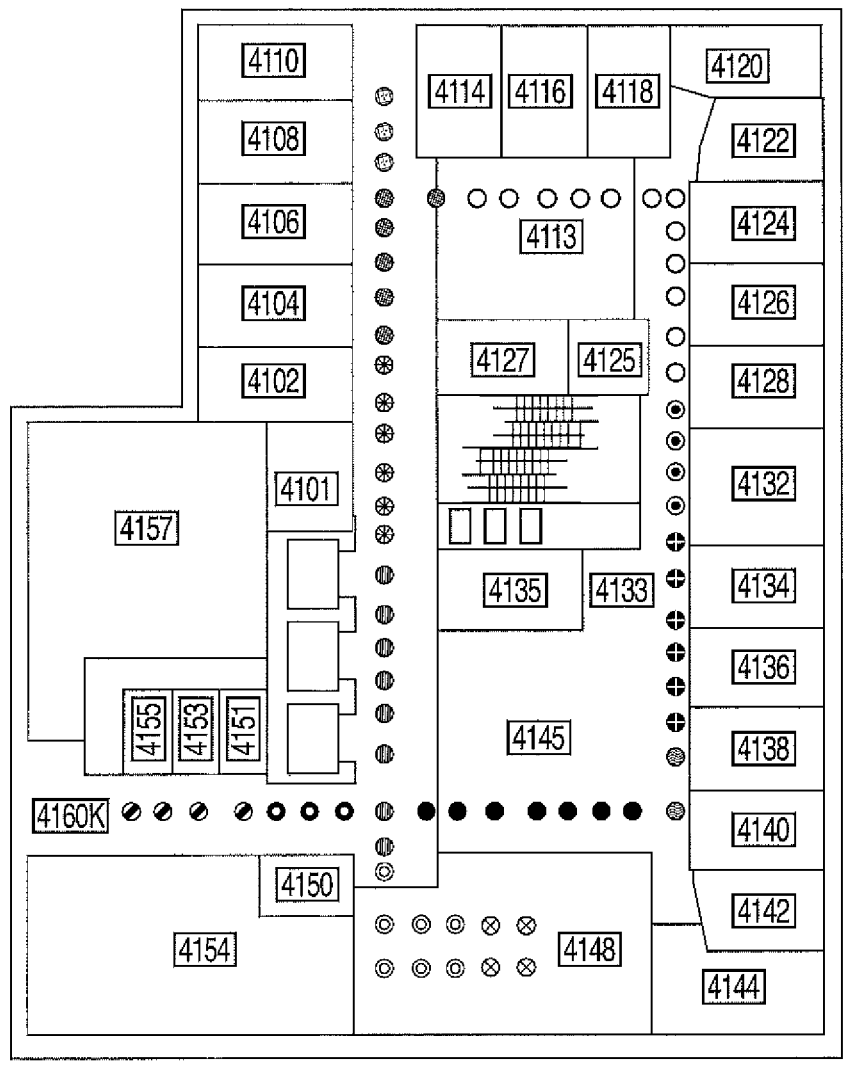
FIG. 5 illustrates an exemplary clustering result on a mobile device in accordance with an embodiment.

In order to mitigate the RSS variations and to remove potential outliers for coarse location determination, affinity propagation is applied on each radio map to generate clusters and their corresponding exemplars during the offline phase. FIG. 5 shows an example of the clustering result on the PDA for the radio map at the north orientation. Each point represents one reference point at which RSS readings are collected, and each fill pattern represents one cluster. It shows that the 72 reference points are divided into 13 clusters, and most of reference points belonging to the same cluster are geographically close to each other. The number of clusters could be different at different orientations. This is a non-limiting example only.

Figure 6:
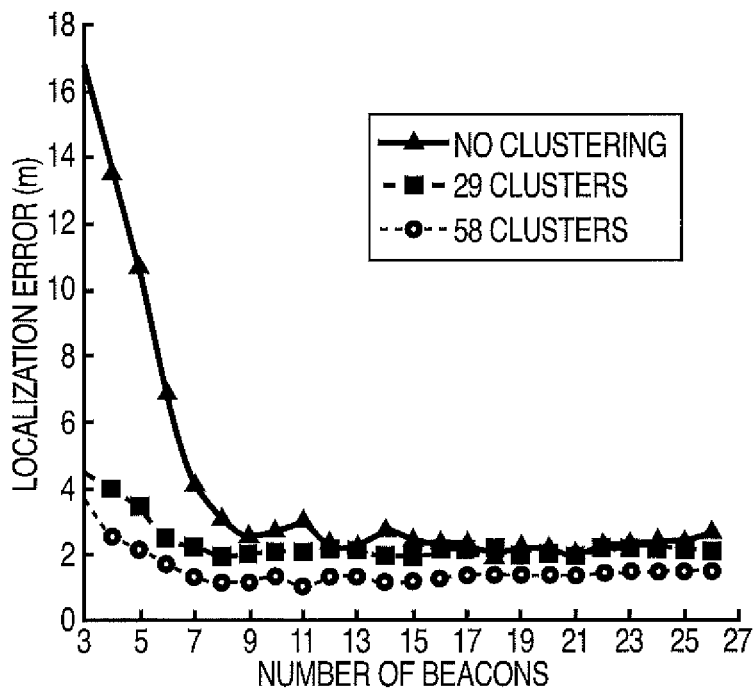
FIG. 6 illustrates results of an average location determination error based on the number of beacons used and a different number of clusters generated in all four orientations.

Since the coarse location determination as previously described is used to reduce the area of interest for location estimate into a subset C, the dimension of the sparse signal in the CS algorithm is reduced to Ñ. According to the theory of compressive sensing, the location indicator can be well recovered when the number of beacons 12 is in the order of log(Ñ). This allows the system to reduce the number of beacons 12 required for accurate location recovery. FIG. 6 shows the average location determination error as a function of the number of beacons 12 used in the algorithm, under different number of clusters generated by the affinity propagation. As illustrated in FIG. 6, only 8 beacons 12 are needed to achieve about 1.1 m error when a total of 58 clusters are generated in all four directions, and 1.9 m error under 29 clusters. However, 18 beacons 12 are needed to achieve 1.8 m error if no clustering scheme is applied.

Figure 7:
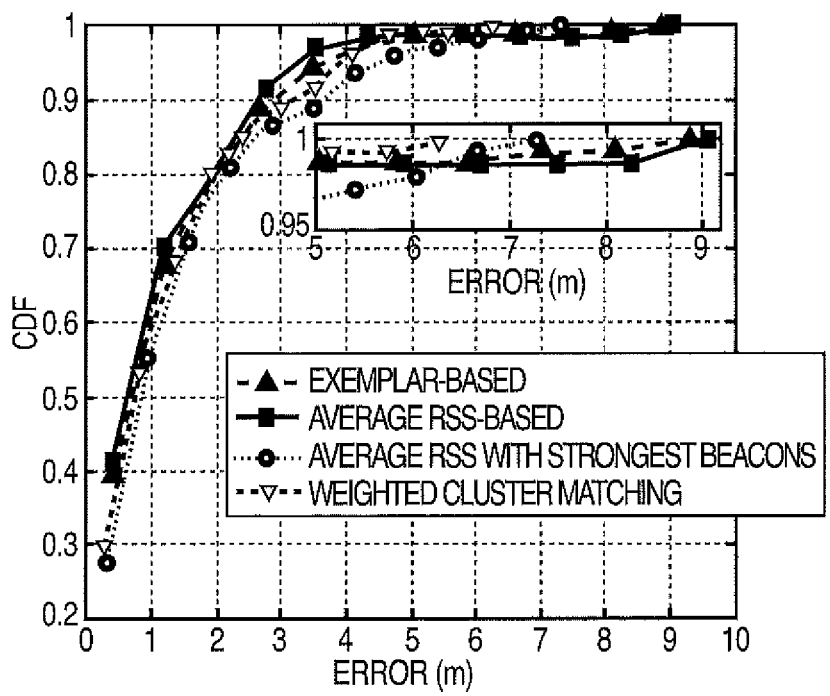
FIG. 7 illustrates a cumulative distribution function (CDF) of the location determination error of the illustrative location system under various coarse location determination schemes (e.g. when ten beacons are used).

Furthermore, the number of clusters generated by the affinity propagation is determined by the input of preference value, which is experimentally set. On one hand, increasing the number of clusters helps to reduce the area of interest into a smaller region after the coarse location determination and thus, improves the average location determination accuracy and also reduces the complexity for the fine location determination. On the other hand, this increases the chance of choosing the wrong cluster, which induces a large location determination error of the positioning system. Therefore, different coarse location determination schemes were studied to reduce the possibility of choosing the wrong cluster. FIG. 7 illustrates the Cumulative Distribution Function (CDF) of the location determination error under different coarse location determination schemes described above, when 10 beacons 12 are used. It is shown that the weighted cluster matching scheme reduces the maximum location determination error from 9.2 m to 6.3 m over the experiments, as it takes into account the stabilities of the RSS readings from different beacons 12.

Figure 8:
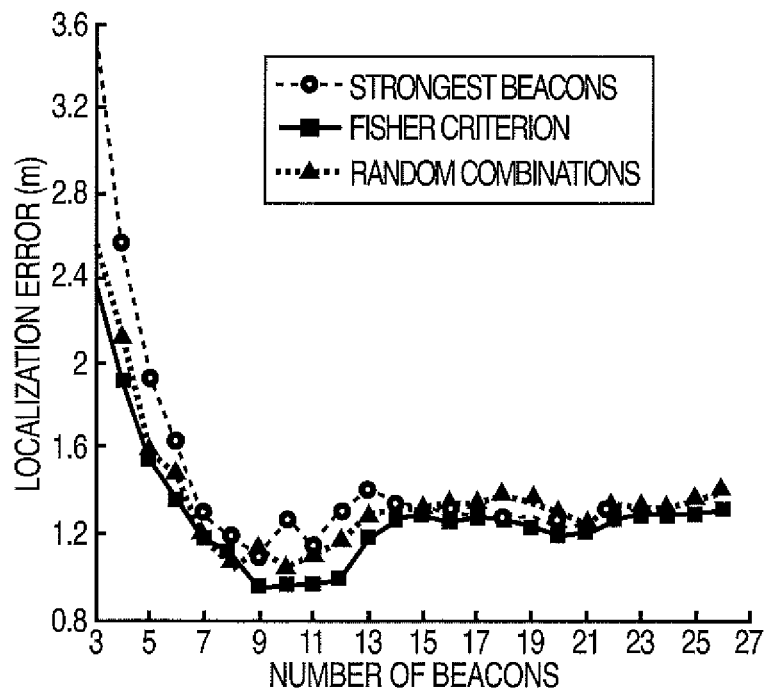
FIG. 8 illustrates the implementation result of an average location determination error under different beacon selection schemes.

FIG. 8 shows the average location determination error under different beacon selection schemes for the fine location determination. In the random combination scheme, according to (19), the value of x-axis implies the number of linear random combinations of online RSS values from the L beacons 12. Among the three schemes proposed, beacon selection using the Fisher criterion achieves the best performance especially when the number of beacons 12 is less than 5, while the strongest beacons 12 selection achieves the worst performance. The proposed random selection scheme achieves a location determination error comparable to that of the Fisher criterion, but does not require a large number of offline RSS time samples to calculate the variance. In addition, the matrix $\Phi$ can be reused for each location update, saving the computational time for the fine location determination.

Interestingly, using more beacons 12 for the fine location determination may not necessarily increase the accuracy due to the biased estimation that is generated by unstable beacons 12. As shown in FIG. 8, when the number of beacons 12 is above 11, the performance of the positioning system decreases. It is not affected by the way the beacons 12 are chosen, as redundant beacons 12 are introduced for all of the three cases.

Figure 9:
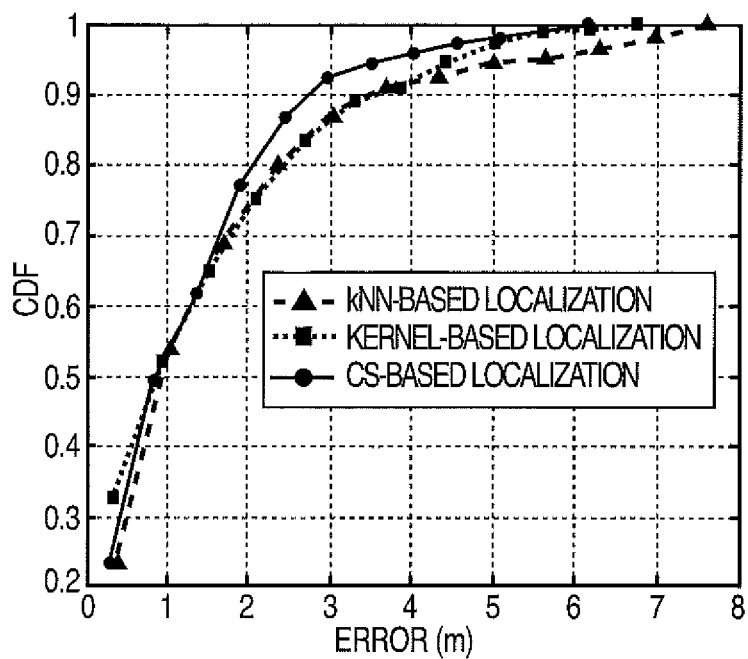
FIG. 9 illustrates the cumulative error distribution for a kernel-based k-nearest-neighbour (KNN) method, and a compressive sensing (CS)-based method in accordance with an embodiment.

In an experiment, the location determination system of the present invention was compared with traditional fingerprinting approaches, known as the KNN and the kernel-based methods, in terms of the cumulative error distribution, when 10 beacons 12 are used. As an illustrative example, the proposed positioning system used affinity propagation to generate overall 58 clusters at four orientations during the offline phase, and then performed coarse location determination by weighted cluster matching, followed by a fine location determination stage consisting of a random beacon combination, an $l_1$-minimization algorithm and a post-processing procedure. For fairness, the three positioning systems use the same coarse location determination scheme, but are different in the fine location determination stage. FIG. 9 shows the implementation result. As observed, with 90% of the time, the proposed CS-based method achieves an error within 2.7 m, and outperforms the KNN and the kernel-based method by 25% and 28%, respectively.

In order to reduce the number of reference points for the fingerprinting approach, the same CS scheme can also be used in the offline phase to reconstruct the radio map based on RSS measurements at only a small number of reference points. In the simulation, only 36 of the reference points are randomly picked, and it is shown that the radio map at the overall 72 reference points can be well recovered compared with the values actually measured at these 72 reference points.

Figure 10:
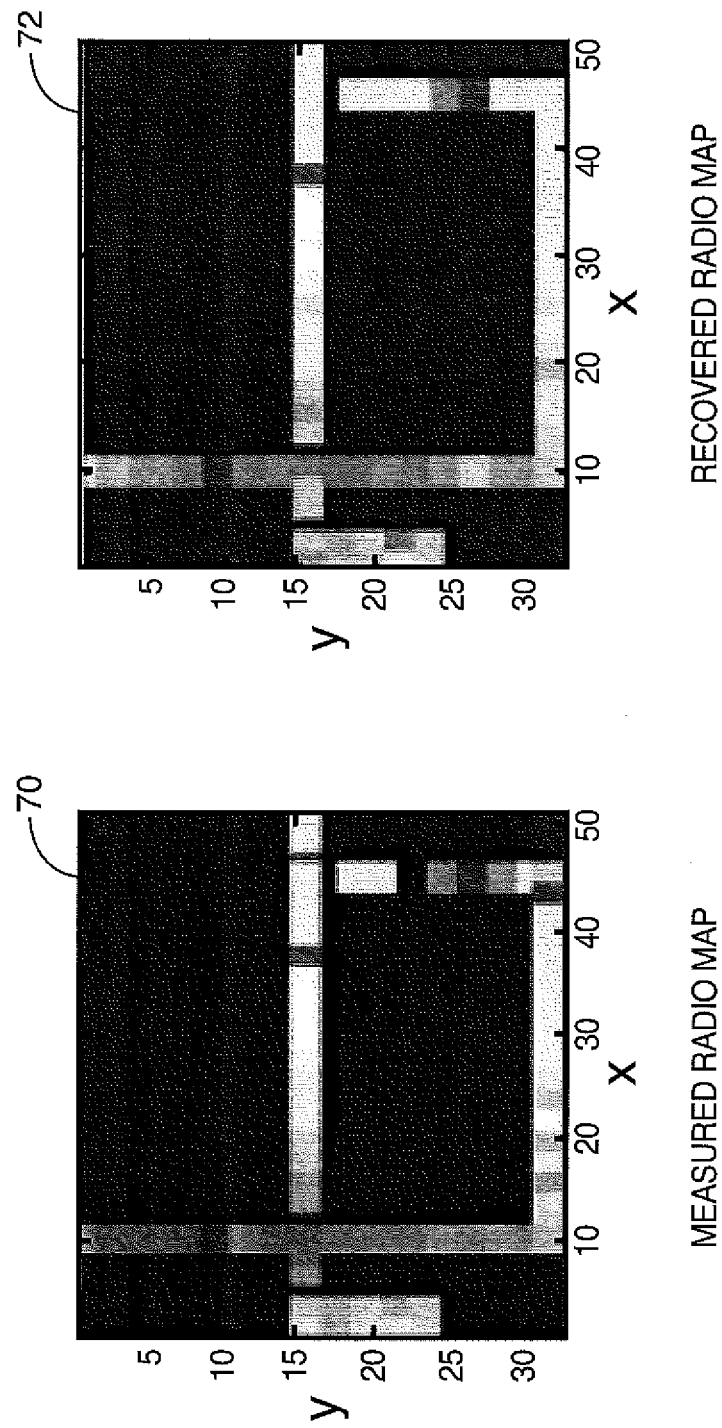
FIG. 10 illustrates recovery of a radio map during an offline phase using CS theory in accordance with an embodiment.

FIG. 10 shows an example of the actual measured RSS radio map 70 from beacon 12 1 at 72 reference points over the experimental area, along with the corresponding reconstructed/recovered radio map 72, based on samples from 36 randomly picked FPs using the same PDA. The same technique is used for recovering RSS readings from the rest of beacons 12.

Figure 11:
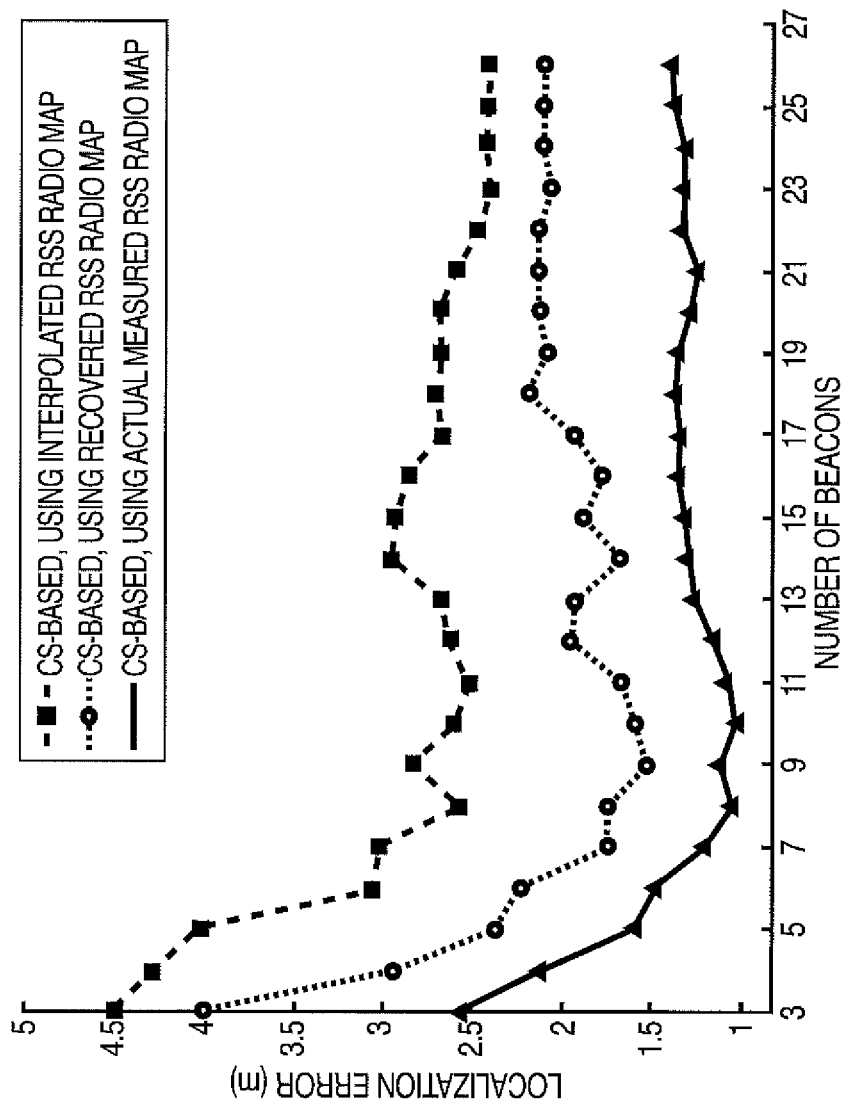
FIG. 11 illustrates a comparison of the location determination accuracy, using actual RSS measurements at 72 reference points, the recovered RSS radio map from samples on 36 reference points, and using interpolated RSS radio map.

A reconstructed RSS radio map was used for location determination, compared with the location determination using the actual measured radio map. FIG. 11 shows that the proposed scheme is able to achieve an average error of 1.6 m by using the reconstructed radio map, when 10 beacons 12 are used. However, using the radio map recovered by the traditional interpolation approach reduces the average location determination error to 2.6 m, when 10 beacons 12 are used.

Example #2

Figure 12:
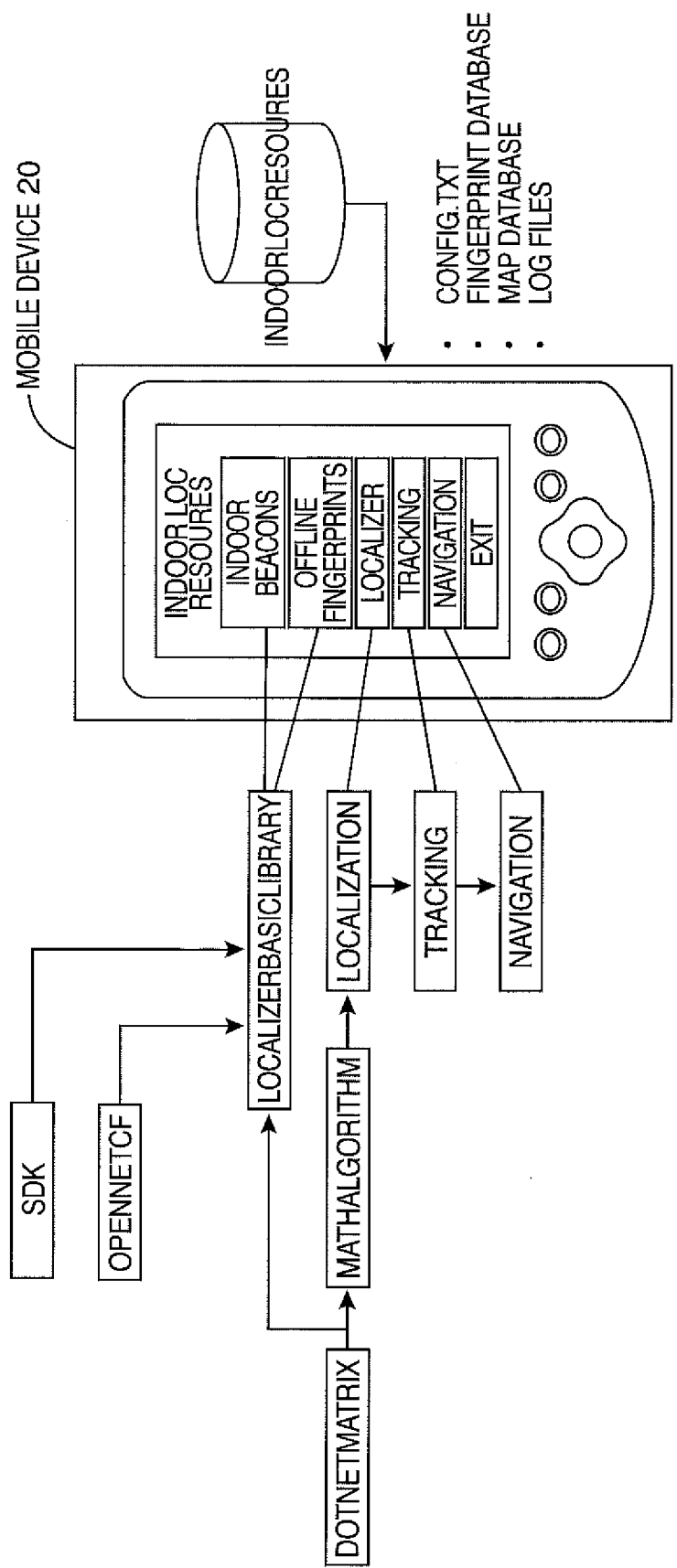
FIG. 12 illustrates a modular overview for implementing a computer program in accordance with an embodiment.

A software application (e.g. indoor location resources) was developed on mobile devices 20 installed with Windows Mobile platform to implement the proposed indoor tracking and navigation system. The software was developed in C# using Microsoft .Net Compact Framework version 3.5. In addition, two open source libraries: OpenNetCF and DotNetMatrix were used to provide the RSS scanning function and matrix operations to the program. The software was tested on a mobile device 20 (e.g. PDA) manufactured by HP, hp iPAQ hx2750. The overview of the software and configured hardware is illustrated in FIG. 12.

The location determination system with prediction was tested at the second floor of the Canadian National Institute for the Blind (CNIB) with area dimensions of 18 m×36 m. During the offline phase, the developed software was run on the PDA to collect 100 RSS time samples for each of four orientations: North, East, South and West (with the sampling rate of 1 sample per second) over 128 reference points (N=128) which are evenly distributed on the site with an average grid spacing of 1.5 m. In this experiment, about 15 clusters were generated for each orientation RSS database, such that the reference points within the same cluster are geographically close to each other and only 2 or 3 outliers are required to be modified.

Several traces were collected to evaluate the performance of the location determination system with prediction. Walking at a constant speed along 4 different traces, as summarized in Table A, RSS readings were collected from visible beacons 12 using the same PDA at 1 sample per seconds.

TABLE A

TRACES SUMMARY

| Trace # | # of turns | # Repetitions | Distance | Average Duration |
|---------|------------|---------------|----------|------------------|
| 1 | 2 | 4 | 53.63 m | 156.3 s |
| 2 | 2 | 4 | 29.43 m | 89.2 s |
| 3 | 0 | 4 | 30.80 m | 84.6 s |
| 4 | 4 | 2 | 91.84 m | 279.5 s |

Figure 13:
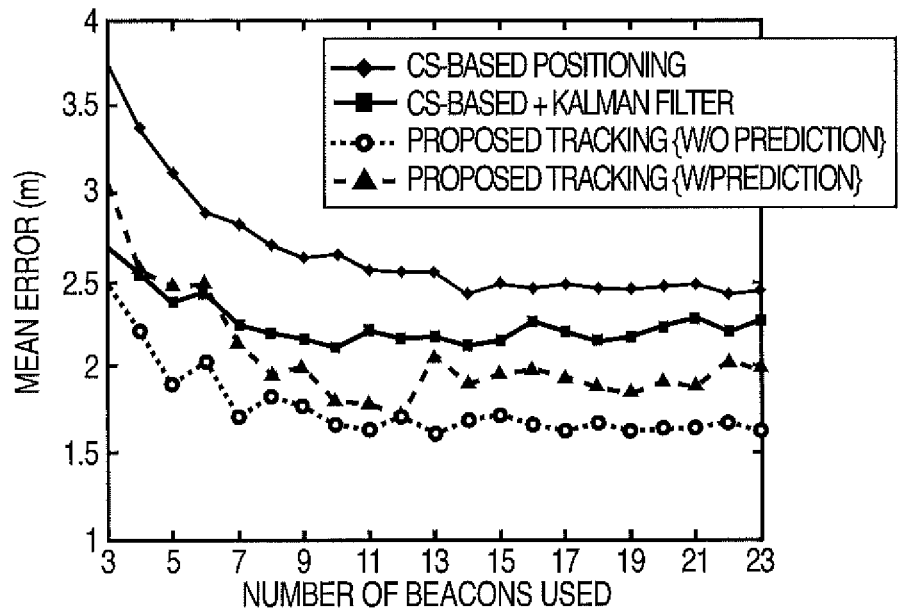
FIG. 13 illustrates a comparison of location determination accuracy of a mobile device for various different positioning and tracking schemes in accordance with an embodiment.

By way of example, FIG. 13 compares four different versions of the location determination system. In the scheme called "CS-based Positioning", only the estimated location of the user is used. In the "CS-based+Kalman filter", the location estimates obtained by the localizer are input into a Kalman filter to further refine the location estimates. The location determination system is also used in two versions: without prediction and with linear prediction. The details of these versions are discussed above.

The mean errors of these systems remain around the same once the number of beacons 12 used are beyond 10 and reflect the property of the CS theory that a minimum bound is required. The location determination system with prediction using either scheme is able to improve the non-prediction location determination system and also achieve better accuracy than by directly applying the Kalman filter. When 10 beacons 12 are used, the location determination system using the unpredicted scheme leads to the average error improvement of 0.98 m (37%) and 0.45 m (21%) over that of the non-prediction location determination system and the Kalman filter respectively.

Figure 14:
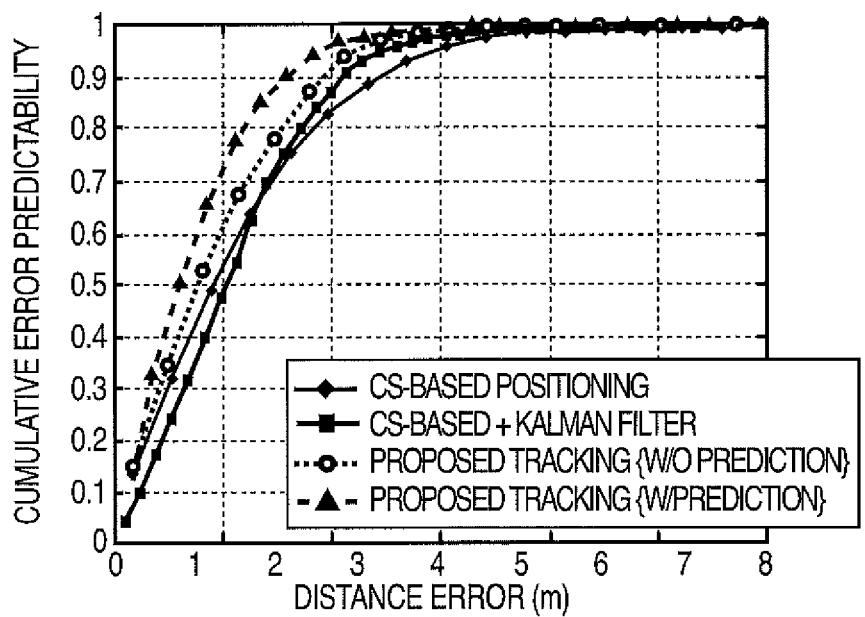
FIG. 14 illustrates a cumulative error probability using ten beacons in accordance with an embodiment.

This example tracking system with the unpredicted scheme is compared with the non-prediction location determination system and the direct applications of the Kalman filter on both the KNN method and the non-prediction location determination system. FIG. 14 shows the comparison results in terms of cumulative error distributions and Table B shows the position error statistics for these four systems. The location determination system outperforms the other three methods, as it has the smallest mean error, 90th percentile error and variance when compared to the other systems.

TABLE B

POSITION ERROR STATISTICS

| Method | Mean [m] | 90$^{th}$ [m] | Max [m] | Var [m^2] |
|---|---|---|---|---|
| CS-based + Positioning Positioning | 2.68 | 5.26 | 26.64 | 4.79 |
| KNN + Kalman Fileter | 2.41 | 4..41 | 10.95 | 2.42 |
| CS-based + Kalman Filter | 2.17 | 4.15 | 24.10 | 2.69 |
| Proposed Tracking | 1.74 | 3.36 | 17.93 | 1.91 |

Figure 15:
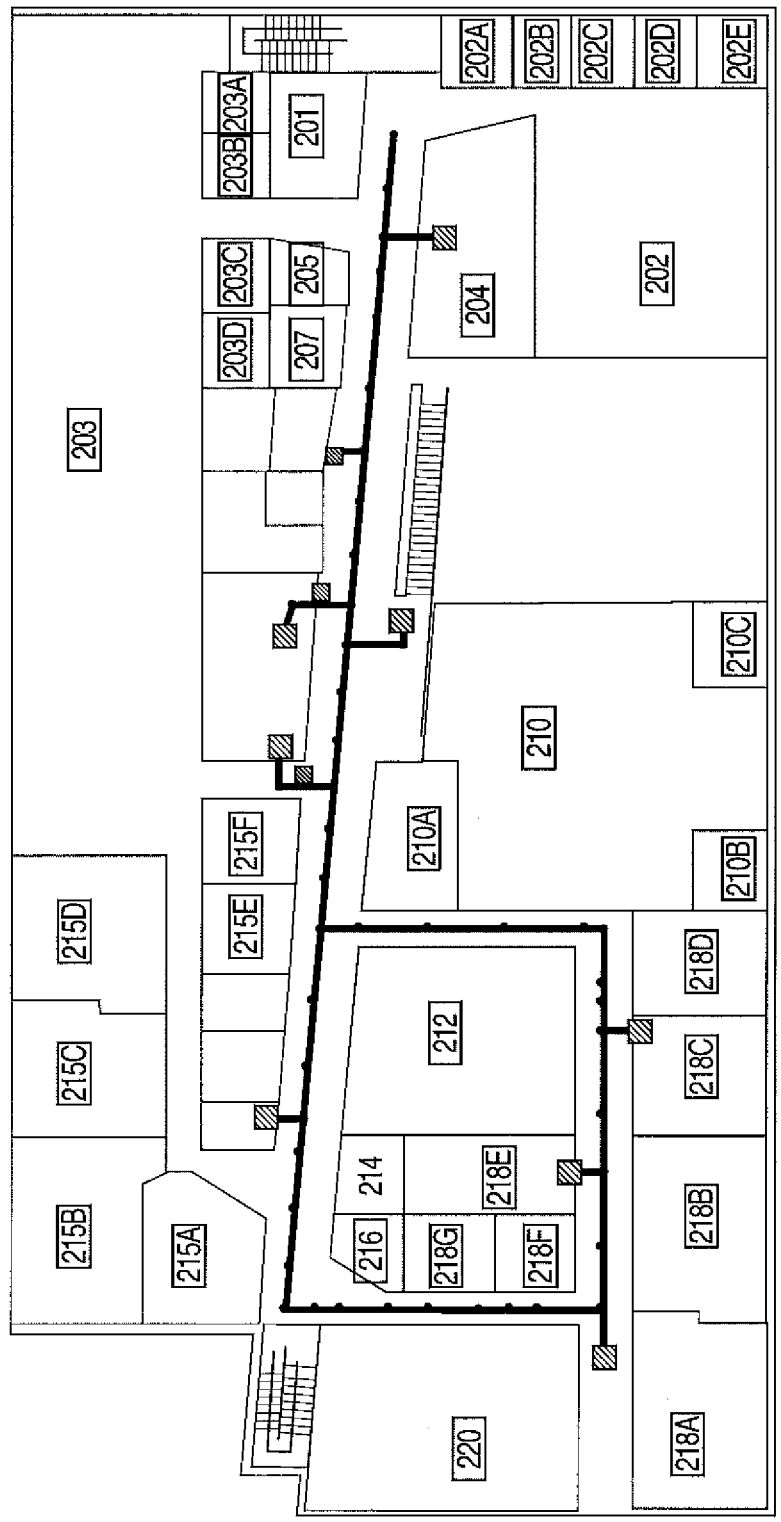
FIG. 15 illustrates a connected graph defined in a test location to be used for path routing.

In an experiment, the navigation module was tested on the same experimental site using the developed software on the mobile device 20. FIG. 15 shows the map with the proper defined nodes, which are used by the navigation module to generate path to the desired destination and give appropriate guidance to the user.

Figure 16:
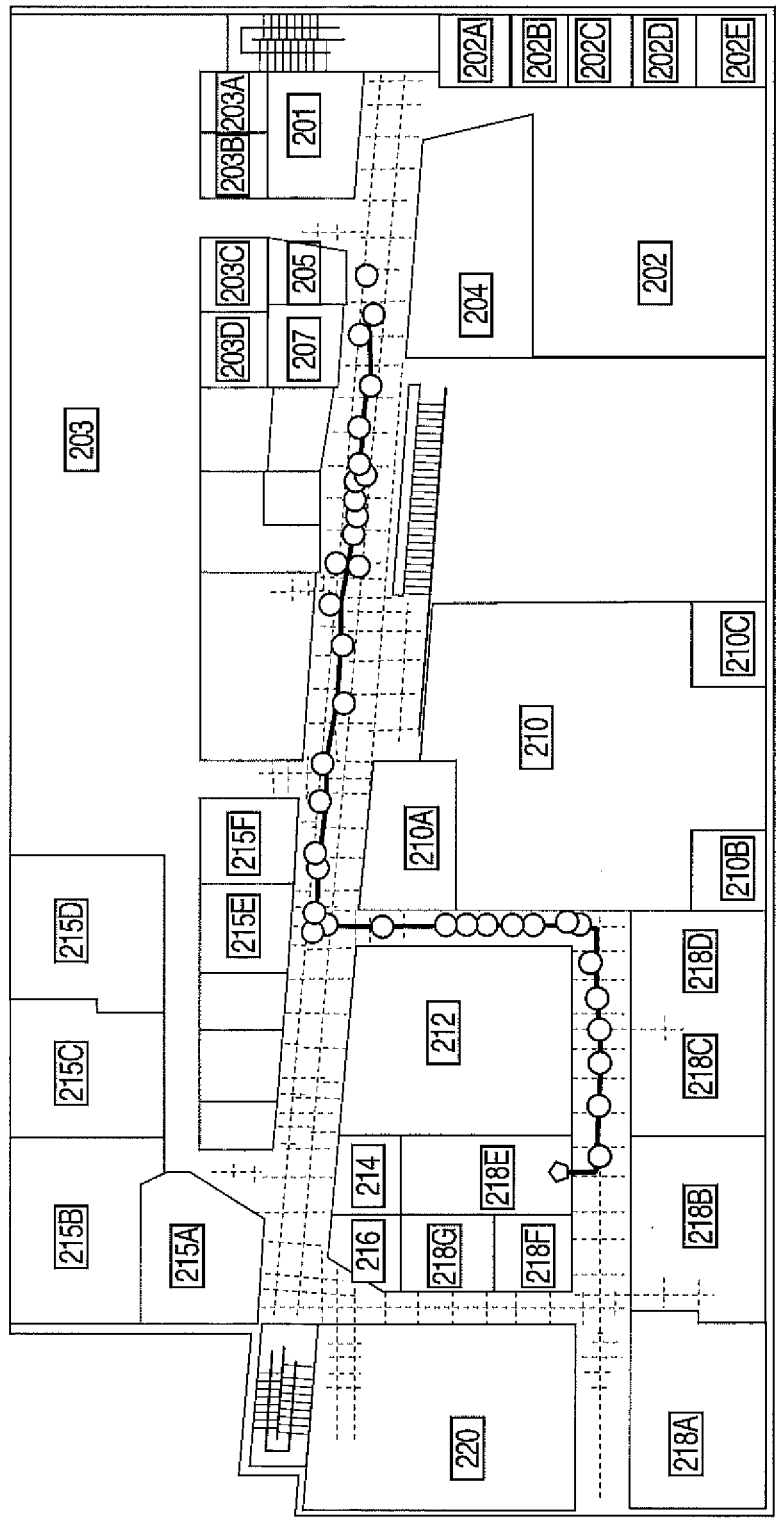
FIG. 16 illustrates a screenshot of a computer program in accordance with an embodiment showing actual tracking of locations for a mobile device.

FIG. 16 illustrates a screenshot of a computer program in accordance with an embodiment showing actual tracking of locations for a mobile device 20. The line shows the routed path generated by the navigation module. The circles denote device's location and the pentagon denotes the destination.

The navigation starts by first asking the user to choose the desired destination on the mobile device 20, then the software finds the user's location and runs the Dijsktra shortest path algorithm on the predefined connected graph to generate the walking path. Then, the tracking system starts, which updates the user's current position every 2 seconds (using 2 RSS time samples for each update). An example screenshot is illustrated in FIG. 16 where the user starts from Room 207 on the map and walks towards Room 218E.

Several visually impaired people were asked to try the navigation device at this experimental site, and the device was able to provide useful guidance to the user to reach his desired destination. Furthermore, the mobile device 20 was able to generate relevant instructions according to the user's calculated locations. In particular, the device was able to lead the participants to reach a spring water fountain, a small, wall-mounted object that is often easily missed by the participants.

Example #3

The embodiments described herein for generating a radio map dynamically may be implemented as a computer system that implements the disclosed techniques.

The embodiments described herein may be further applied in a number of practical systems that utilize the radio map prediction mechanism provided in this disclosure.

For example, a system and method may be constructed using the radio map prediction mechanism of the embodiments described herein that is configured to quickly monitor a person's location in an indoor environment to provide better security and protection services. Such a system may be used for example to monitor the location of a child in a kindergarten, a patient in a hospital, an elderly in an open indoor area, etc.

In another possible application of the system and method disclosed, a computer system may be configured to dynamically generate a radio map covering an indoor or outdoor area associated with one or more smart TVs. The computer system may be used to generate efficiently a radio map covering a plurality of units in a condo building for example. The radio map may enable for example neighbours in the building to interact with one another while watching the same TV program based on the definition of the different units using the radio map. The radio map may also enable the targeting of residents with location-based or behaviour-based advertising while maintaining the privacy of residents.

Localization of wireless devices using the dynamic radio mapping mechanisms described in this disclosure may be used to enhance user interactions through social networking platforms, based on location information without the need for localization that requires the monitoring of location of wireless devices using a central server. For example, the mechanism described for dynamic generation of a radio map may be used to support a friend finder computer system in a shopping mall, or a coupon system targeting shoppers in a shopping mall based on their current location. The coupon may relate to a merchant proximate to the user's current location or along a predicted path.

Also, the inventive technique used to generate radio maps dynamically may be utilized for other applications where there is a need to automate the generation of a map that is configured to receive multiple types data elements. The non-parametric approach disclosed for constructing a graph from RSS measurements may be used in other applications such as for example: (i) dynamically constructing an image library from a large collection of images by binding image information to graph nodes or RSS signatures for easy location based retrieval; (ii) dynamically constructing a handwriting sample library for use in a handwriting recognition system and then using location based services to authenticate or validate signatures based on RSS signatures; (iii) dynamically constructing a voice recognition library from multiple speech samples by linking voices or speech samples to locations which may in turn be represented as graph nodes; (iv) dynamically generating a genetic or genomic information classification library from genetic information records, (v) dynamically generating a gaming element library for use by a game generator by binding gaming elements to nodes of the graph, (vi) dynamically generating a audio/visual content library audio/visual content elements.

Automatic and Dynamic Generation of RSS Radio Maps

With the wide deployment of mobile wireless local area networks (WLAN) and mobile wireless devices, there is a growing interest in providing location-based services (LBSs) such as navigation and people and assets tracking in indoor environment where global positioning system (GPS) is not available. Some effort has been directed to studying RSS-based localization algorithms such as wardriving, where a pre-collected RSS radio map, a complete table of RSS readings at defined grid points on the map, is required. However, to generate and maintain the environment specific radio map manually involves an extensive labor cost and limits service site. Embodiments described herein provide an indoor positioning system that learns and generates the RSS radio map automatically and dynamically with only a small number of calibrations (e.g. known pairs, fingerprint samples) through semi-supervised learning and compressive sensing.

A key point in generating the RSS radio map is to build a comprehensive relationship between RSS readings and positions. Extensive labor cost may come from labeling RSS readings on each grid point manually. Therefore, in order to avoid a large amount of calibrations, the RSS readings are collected through a way such that each user in the environment contributes the RSS scanning result from his/her mobile device without even notice (e.g. crowd-sourcing). The associated position of each RSS scanning result is then represented as a node on a connected graph, and can be learned from the graph structure with a small number of labels. Compressive sensing is a method to recover sparse signals from a small number of noisy measurements through an $l_1$-minimization program, to build the graph from reported RSS scanning results. To make this possible, embodiments described herein may rely on two assumptions on the graph: smoothness, which intuitively implies that physical nearby nodes have similar RSS readings, and sparseness, which implies that each node only has a small number of adjacency.

In an embodiment, the proposed indoor positioning system was implemented on an Android mobile device (e.g. HTC Desire z, or other manufacturer/model/make) to evaluate the performance. The accuracy of the radio map generation is evaluated by comparing the predicted radio map with actual fingerprints that are manually collected from the environment. The accuracy of the overall positioning system proposed was evaluated in previous studies by the inventors using the predicted radio map. Experimental results indicate that the proposed system does not require a large amount of offline calibrations, reducing the labor cost of collecting fingerprints significantly, while maintaining a satisfactory level of localization accuracy. In practice, the generated RSS radio map can be used by any fingerprinting-based positioning system as an offline database, where online location estimation can be applied.

The major challenge for accurate positioning systems comes from the variations of RSS due to the dynamic and unpredictable nature of radio channel, such as shadowing, multipath, the orientation of wireless device, etc. Therefore, the use of radio propagation models to interpret the RSS-position relationship may be prone to large errors. Hence, fingerprinting is often used instead to estimate the location of the user. This method involves two phases: i) RSS readings are collected at known grid points, named as reference points (RPs), during an offline phase to create a fingerprint database and ii) online RSS readings are compare with the database to estimate the user's location, using either deterministic approaches or probabilistic approaches.

Embodiments described herein provide a new RSS-based indoor positioning system that can be implemented on mobile devices 20, as described herein. The localization problem may be re-formulated into a sparse-natured problem, and it is possible to use the theory of compressive sensing to match the signal strength measured by the mobile device to the fingerprint database. The location estimator also consists of two phases. In the offline phase, RSS readings are collected on a grid of reference points. The RSS readings are then decomposed into multiple clusters using an affinity propagation algorithm. The online phase consists of the mobile device measuring RSS, using a coarse localizer to find the clusters to which it belongs, and a fine localizer to refine the location estimation by solving an minimization problem. The system was shown to have better accuracy than other fingerprinting-based methods: the k-nearest neighbor method, which computes the estimate as the centroid of the k closest neighbors whose RSS readings have the shortest Euclidean distance to the online RSS readings, and the kernel-based method, which estimate the posterior distribution of the location by using the Bayesian theory and kernel functions. However, the offline phase always involves an extensive labor cost, and LBSs can be only provided in those controlled environments where fingerprints are pre-collected.

The inventors have realized that the extensive labor cost in fingerprinting-based positioning systems comes from labeling RSS readings on each reference point manually. Let $(r_i, p_i)$ be the RSS-position pair at RP i, where $r_i = [r_{1,i}, \ldots, r_{L,i}]$ is the power reading from L access points, and $p_i = [p_x^i, p_y^i]$ is the corresponding coordinates of RP i, i=1, . . . , N and N is the total number of RPs. A large number of ri can be collected through a crowd sourced way such that each user in the environment contributes the RSS scanning result from his/her mobile device without even notice. In addition, ri can be collected by simply carrying the mobile device and walking round the environment in normal course. Therefore, ri is available in large quantity and easy to collect, while obtaining pi manually could be labor intensive. In order to solve this problem, for each unlabeled $r_i$, the present system and method is adapted to learn the corresponding $p_i$ automatically from as few labeled samples as possible. An EZ model may solve the problem by estimating unknown parameters in the radio propagation model using a genetic algorithm (GA). However, the algorithm is based on a strict assumption on the radio propagation model. Meanwhile, due to the high complexity of GA, the learning procedure is very slow. Embodiments described herein address the problem from the view of semi-supervised learning, which maps high dimensional data (RSS readings) to a low dimensional representation (i.e. a 2D position) from only a small number of labeled samples (e.g. known pairs of data elements, dimensional data). Graphing is a powerful tool to find a data structure that needs to be preserved during the dimensionality reduction.

A graph may be constructed using different approaches, such as the k-nearest neighbor graph and the $\varrho$-ball graph. These traditional graph construction algorithms may require a certain number of parameters that need to be manually set, and the parameters may have a great impact on the graph structure. Therefore, the learning result is sensitive to the graph parameters, which may reduce the robustness of the system. Compressive sensing provides a novel framework for recovering sparse or compressible signals from far fewer noisy measurements than that needed by the Nyquist sampling theorem, for example. The sparse signal can be reconstructed exactly with high probability by solving an l1-minimization problem. The embodiments described herein propose a nonparametric approach to construct the graph. The graph neighborhood connection problem may be formulated into a sparse signal recovery problem, where CS is applied. In some embodiments, the proposed approach may rely on two assumptions on the graph: smoothness, which intuitively implies that physical nearby nodes have similar RSS readings, and sparseness, which implies that each node only connects to a small number of adjacency.

Example Problem Setup and System Architecture

In a typical WLAN positioning scenario, each user carries a mobile device 20 equipped with a WLAN adapter, reporting RSS measurements from available APs in an indoor environment. These type of RSS readings can be collected in large quantity through the crowd sourced dynamic way as each user in the environment contributes the RSS scanning result from his/her mobile device 20 without even notice. However, the corresponding location information is missing to the system. Meanwhile, a small number of RSS-position data pairs are collected beforehand and saved in the server. The location of the available APs is also unknown to the system. The main task of the positioning system is to i) generate a complete RSS radio map that includes all the RSS-position information; ii) and illustrate each user's current location on the device.

Figure 17:
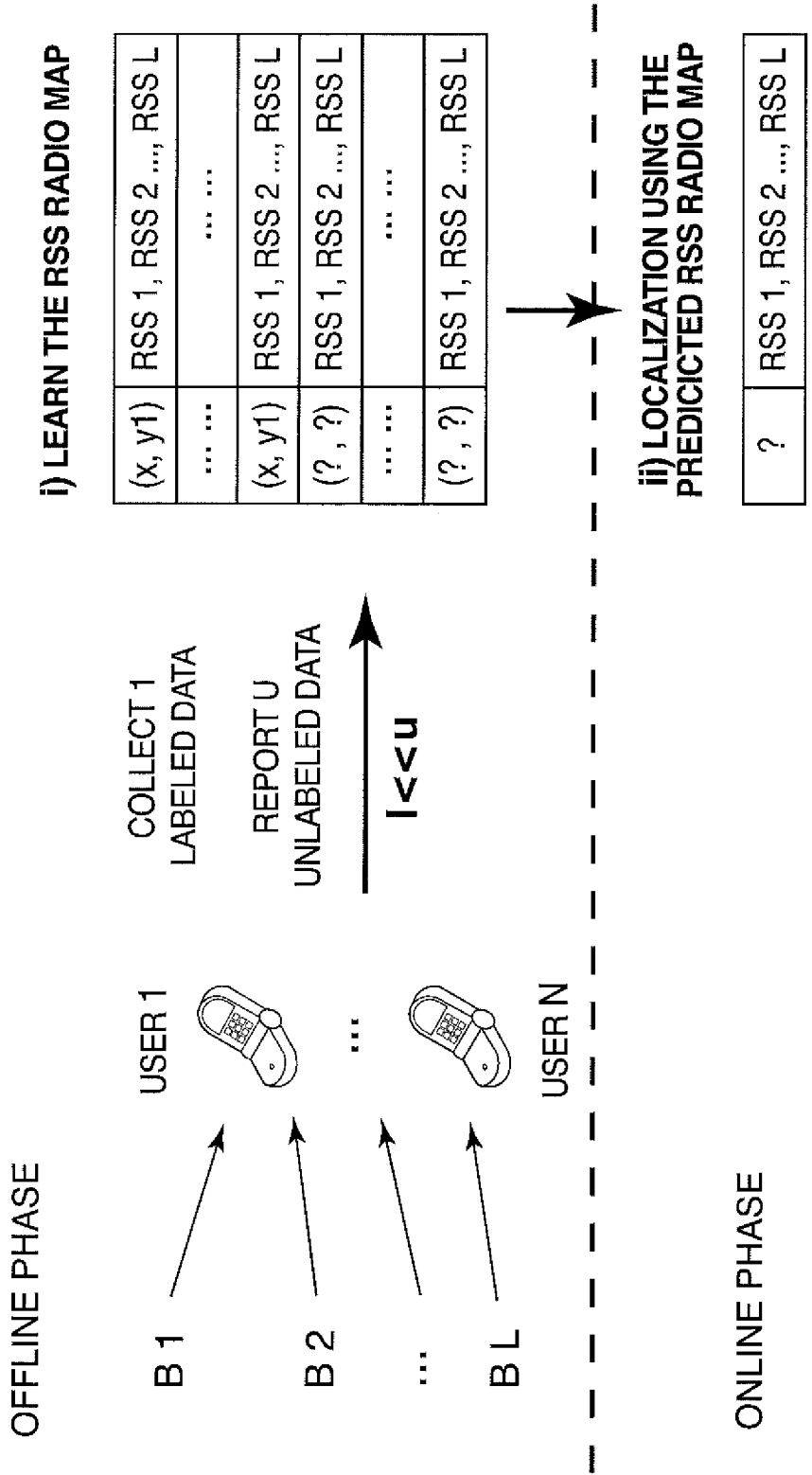
FIG. 17 shows an RSS radio map including a complete table of reported RSS vectors and their location.

The RSS radio map may be a complete table of reported RSS vectors and their location, as FIG. 17 shows. If the table is dense enough, the location of a new coming mobile user can be estimated by comparing the current RSS readings to the pre-stored radio map. The expression $(r_i, p_i)$ is used to represent the small number of collected RSS-position data pairs, defined as labeled data, where each $r_i = [r_{1,i}, \ldots, r_{L,i}]$ is the power reading from L available access points, and $$r_{l,i} = \frac{1}{q} \sum_{t=1}^{q} r_{l,i}^{(t)}$$

is the averaged power reading from access point l over q time samples (q>0). $p_i = [p_x{}^i, p_y{}^i]$ is the corresponding coordinates of RP i, i=1, . . . , l. The expression (rj) is used to represent the large number of reported RSS readings from users without knowing location, where j=l+1, . . . , l+μ. It is noticed that l<<μ. Then, the average of the RSS in the radio map, including the labeled and unlabeled RSS can be represented by Ψ.

$$\Psi = \begin{bmatrix} r_{1,1} & r_{1,2} & \cdots & r_{1,l+u} \\ r_{2,1} & r_{2,2} & \cdots & r_{2,l+u} \\ \vdots & \vdots & \ddots & \vdots \\ r_{L,1} & r_{L,2} & \cdots & r_{L,l+u} \end{bmatrix} \quad (48)$$

where each column, RSS vector, represents the RSS readings at each RP. If no RSS reading found for a beacon 12 at a RP, the corresponding RSS entity in the radio map is set to a small value (e.g., −110 dBm in the present implementation) to imply its invalidity. The purpose of the learning system is to find a predictor f:r→p, such that for each RSS vector, the corresponding location $p_k$ can be obtained, where k=1, . . . , l+μ, as shown in Table I.

TABLE I

Input and Output of the Learning System

Input of the system:
  a. a small number of labeled data pairs: $(r_i, p_i)$, i = 1, ..., l
     where $r_i = [r_{1,i} ..., r_{L,i}]$, and $p_i = [p_x{}^i, p_y{}^i]$;
  b. a large number of unlabeled data: $(r_j)$
     j = l + 1, ..., l + u, l << u;
output of the system:
  a. predictor f : r → p
     $p_k$, ∀k ∈ {1, ..., l + u}

Objective Function by Semi-Supervised Learning

In this approach, a weighted graph G=(V, E) may be used to describe the above problem, where V={$p_1, \ldots, p_l, p_{l+1}, \ldots, p_{l+u}$} is the vertex set with each node representing the location of one RP, and E is the edge set between pairs of vertices. Associated with each node is a RSS vector. Associated with each edge $\epsilon_{ij} \in E$ is a real non-negative number $w_{ij}$, named as weight, ∀i,j∈{1, . . . , l+μ }, with l<<μ. The graph weight can be determined by a measure of similarity from RSS readings at pairs of RPs and thus, the graph structure is preserved from the high dimensional data (RSS readings) to the low dimensional representation (e.g. 2D position) by predictor f. The graph construction and graph weight calculation will be discussed in more detail further below. Since the location of the first l nodes in V is known to the system, once the structure of the graph is determined, the location of all the nodes can be predicted. A good predictor f:r→p relies on two factors, one that is consistent with the measured labels, and one that preserves the graph structure during the dimensionality reduction. Intuitively, physical nearby nodes should have similar RSS readings. This feature is defined as the smoothness of the graph. Therefore, f can be learned from the following $$f^* = \operatorname*{argmin}_{f} \left\{ \sum_{i=1}^{l} |f(r_i) - p_i|^2 + \frac{\gamma}{2} \sum_{i=1}^{l+u} \sum_{j=1}^{l+u} w_{ij} |f(r_i) - f(r_j)|^2 \right\} \quad (49)$$

where the first term is a fitting error that comes from the labeled data pairs. The predicted location from RSS readings at these labeled RPs should be consistent with the actual measured location. The second term enforces smoothness on the graph. Nodes that are connected with larger weights should be physically closer to each other, and vice versa. γ is a fixed smoothness coefficient (γ=0.01 in the present implementation). By using matrix representation, it is easy to show that equation (49) is equivalent to $$f^* = \operatorname*{argmin}_{f} \left\{ \sum_{i=1}^{l} |f(r_i) - p_i|^2 + \gamma \cdot Tr(f^T L f) \right\} \quad (50)$$

where f is a (l+μ) (l+μ)×2 matrix with each row representing the predicted 2D location of one node on the graph. Tr(.) denotes the trace of a square matrix, and the superscript T denotes transposition. L is the graph laplacian, which can be calculated from the graph weight by $$L = D - W \quad (51)$$

where W(l+μ)×(l+μ) is the Graph Weight Matrix, with Each Column, Denoted as wi, representing the weight of all the nodes on the graph to node i. D=diag($d_1, \ldots, d_{l+u}$), and di is the sum of the ith row of W, namely, $$d_i = \sum_{j=1}^{l+u} u'_{ij}.$$

Graph Construction by Compressive Sensing

In accordance with some embodiments, a key aspect of the present semi-supervised learning approach is the graph construction and the graph weight calculation. There are different approaches to graph construction, such as the k-nearest neighbor graph, where each node connects to the top k nodes that have largest similarities, and the ε-ball graph, where each node connects to all the nodes that fall into its vicinity within an Euclidean distance of ε. However, the graph defined by these two methods are both symmetric, and the ε-ball graph does not guarantee the connectivity of the graph, which leads to isolated subgraphs. Meanwhile, since the neighborhood structure is predetermined and fixed by parameters (k or ε) that are manually set, these methods cannot well characterize the real geometrical relations among nodes. Different parameter settings would bring different graph structures, resulting quite different learning outputs.

As will be described, embodiments described herein may take a nonparametric approach to construct the graph and calculate the graph weight only from RSS readings (as example data elements). Since each node only connects to a certain number of physical nearby nodes, the graph connection has a sparse nature. More specifically, the weight finding of each node (wi) can be formulated as a sparse signal recovery problem, where compressive sensing can be applied.

Let $\Psi^{(i)}$ represent the RSS radio map defined in equation (1) excluding the ith column. If the radio map is dense enough, the RSS readings at node i on the graph can be approximately expressed as a linear combination of RSS readings at its adjacent nodes. The weight vector wi represents the contribution of each node to node i in representing its RSS signature, i=1, ..., 1+μ.

A M×L matrix $\Phi$ is defined as an beacon selection operator applied on the RSS vector ri, such that $$y_i = \Phi r_i \quad (52)$$

where each row of $\Phi$ is a 1×L vector with all elements equal to zero except $\phi(l)=1$, where l is the index of the beacon 12 that is selected:

$$\phi_m = [0, \ldots, 0,1,0, \ldots 0], \forall m \in \{1,2, \ldots, M\}. \quad (53)$$

Since unreliable beacons 12 may lead to biased estimation and affect the stability of the positioning system, the purpose the AP selection procedure is to select a subset of reliable beacons 12 for further accurate calculation. Different beacon selection approaches may be used. For the simplicity, the strongest beacon selection is used. For each node, the set of beacons 12 with the highest RSS readings is selected, arguing that the strongest beacons 12 provide the highest probability of the coverage over time. Specifically, the RSS vector ri is sorted in the decreasing order of RSS readings, and the beacons 12 corresponding to the least indices are used. Since $\Phi$ is created based on each ri, this criterion may create different $\Phi$ for each node.

Based on the above definitions, the selected RSS readings at node i can be expressed as $$y_i = \Phi \Psi^{(i)} \theta_i + \epsilon \quad (54)$$

where $\theta_i$ is a sparse vector with the dimension of (1+μ−1)×1, representing the weights of all the other nodes on the graph to node i, and $\epsilon$ is the unknown estimation error. Therefore, the goal is to find the weight vector for each node, given $y_i$, $\Phi$ and $\Psi^{(i)}$, $\forall i \in \{1, \ldots, 1+u\}$.

Besides sparsity in equation (54), incoherence between $\Phi$ and $\Psi^{(i)}$ is another important property that should be satisfied to enable the use of CS theory for a sparse signal recovery from small number of measurements. Therefore, an orthgonalization procedure may be used to induce such property.

Define an orthogonalization operator T as $$T = QR^T \quad (55)$$

where $R = \Phi \Psi^{(i)}$, and $Q = \text{orth}(R^T)^T$, where orth(R) is an orthogonal basis for the range of R, and $R^\dagger$ is a pseudo-inverse of matrix R.

The orthogonalization process is done by applying the operator T on the RSS vector yi, such that $$z_i = T y_i = Q R^\dagger R \theta_i + \epsilon' \quad (56)$$

where $\epsilon' = T \epsilon$. It is straightforward to show that $QR^\dagger R = Q$. Therefore, the graph weight calculation problem for node i formulated in equation (54) can be reformulated as $$z_i = Q \theta_i + \epsilon'. \quad (57)$$

Here Q is a nearly orthogonal matrix with unit norm (there are more columns than rows), and obeys the Restricted Isometry Property (RIP) that is needed by the CS [18][19]. Since $\theta_i$ has a sparse nature, according to the theory of compressive sensing [5][6], if the number of selected beacons 12 M is in the order of log (1+μ), the sparse vector $\theta_i$ can be well recovered from zi with high probability, by solving the following l1-minimization problem.

$$\hat{\theta}_i = \arg \min_{\theta_i \in \mathbb{R}^{l+u-1}} \|\theta_i\|_1, \quad (58)$$
$$\text{s.t. } z = Q\theta_i + \varepsilon'.$$

where $\|\cdot\|_1$ is the l1-norm of a vector.

On a special note, if the number of beacons 12 (M) is too small, clustering algorithms such as affinity propagation or k-means [20] can be used to generate subgraphs, and the above algorithm can be applied within each cluster. Finally, keep all the positive values in $\hat{\theta}_i$, and the (1+μ)×1 weight vector $w_i$ relates to $\hat{\theta}_i$ by $$w_{ji} = \begin{cases} \hat{\theta}_i(j) & \text{if } j < i \\ 0 & \text{if } j == i \ \lor j \in \{1, \ldots, l+u\}. \\ \hat{\theta}_i(j-1) & \text{if } j > i, \end{cases} \quad (59)$$

The weight matrix W is obtained by applying the same approach on each of the nodes on the graph.

Since it is assumed that the RSS readings at each node can be approximately expressed as a linear combination of RSS readings of its adjacency. There is one case that two nodes are connected with a large weight when there is a direct shift in RSS readings. In order to compensate for the error induced by the linear assumption, a heat kernel function can be used to filter out the incorrect edges and thus, corrects the graph structure. The heat kernel function defines the similarity between two nodes by using their absolute RSS distance. Therefore, the graph weight matrix W is updated by $$W := W.*K, \text{ where } K(i,j) = \exp(-\|r_i - r_j\|_2)/4 \quad (60)$$

where .* is the element-wise multiplication between two matrices. The heat kernel function keeps the large weight with small RSS difference between two nodes while eliminates the above case. Table II illustrates detailed steps for the graph construction and weight calculation.

TABLE II

Graph construction and weight learning procedures for i = 1 : l + u, do
  a. set $\Psi^{(i)} = [r_1^T, \ldots, r_{i-1}^T, r_{i+1}^T, \ldots, r_{l+u}^T]$
  b. generate matrix $\Phi$ by selecting the strongest APs in $r_i$
  c. let $y_i = \Phi r_i$
  d. perform orthogonalization such that $z_i = T y_i$
  e. solve the following $l_1$-minimization problem;
    $\hat{\theta}_i = \arg \min_{\theta_i \in \mathbb{R}^{l+u-1}} \|\theta_i\|_1, \text{ s.t. } z = Q\theta_i + \epsilon^i.$
    for j = 1 : l + u, do
      if(j < i), set $w_{ji} = \hat{\theta}_i(j)$
      if(j == i), set $w_{ji} = 0$
      if(j > i), set $w_{ji} = \hat{\theta}_i(j-1)$
    end
end Closed-Form Solution After building the graph from RSS readings using compressive sensing, the graph laplacian L can be calculated by (4). Finally, the closed-form solution to the objective function in equation (50) is given by [21]

$$f^* = (J + \gamma L)^{-1} JP \quad (61)$$

where $J=\text{diag}(\delta_1, \ldots, \delta_{l+\mu})$, and identifier $\delta_1$, takes the value 1 at the labeled position and 0 at the unlabeled position, namely, $$\delta_i = \begin{cases} 1 & \text{if node } i \text{ is labeled} \\ 0 & \text{if node } i \text{ is unlabeled} \end{cases} \quad (62)$$

P is the initialized position matrix for all the nodes, $P=[p_1^T, \ldots, p_{l+\mu}^T]^T$, where $$p_i = \begin{cases} p_i & \text{if } \delta_i = 1 \\ \text{arbitrary} & \text{if } \delta_i = 0. \end{cases} \quad (63)$$

The learning result f* is a $(l+\mu)\times 2$ matrix with each row representing the predicted 2D location of one node on the graph.

Test Setup and Software Overview

Figure 18:
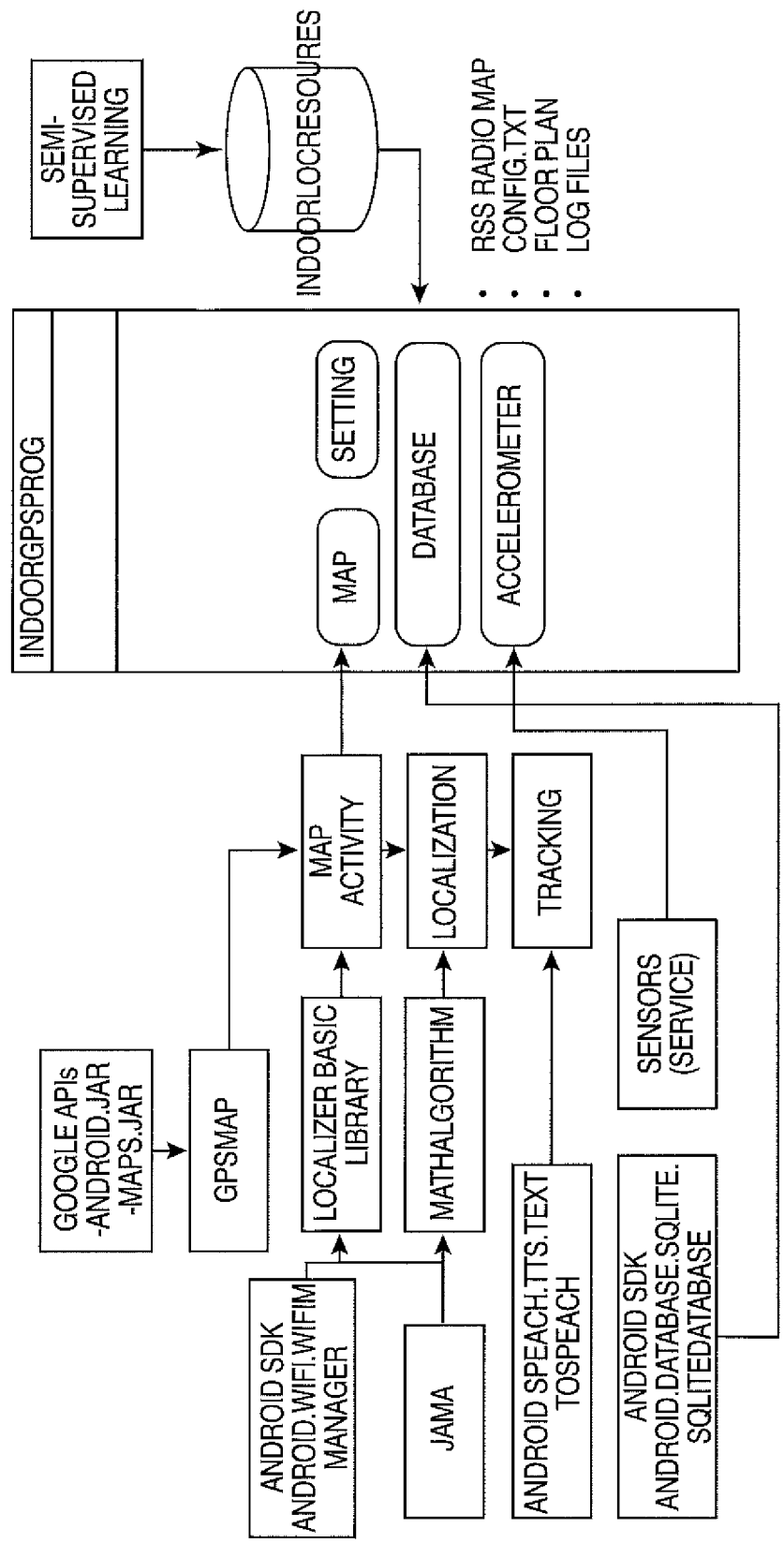
FIG. 18 shows an RSS radio map learning and positioning software developed and installed on a popular mobile OS platform.

The RSS radio map learning and positioning software was developed and installed on the Android platform, as FIG. 18 shows. The software was developed in Java using the Android SDK, and installed on a smartphone (HTC Desire z with Android 2.2). In addition, Google APIs add-on and Jama package are installed as external libraries.

Figure 19:
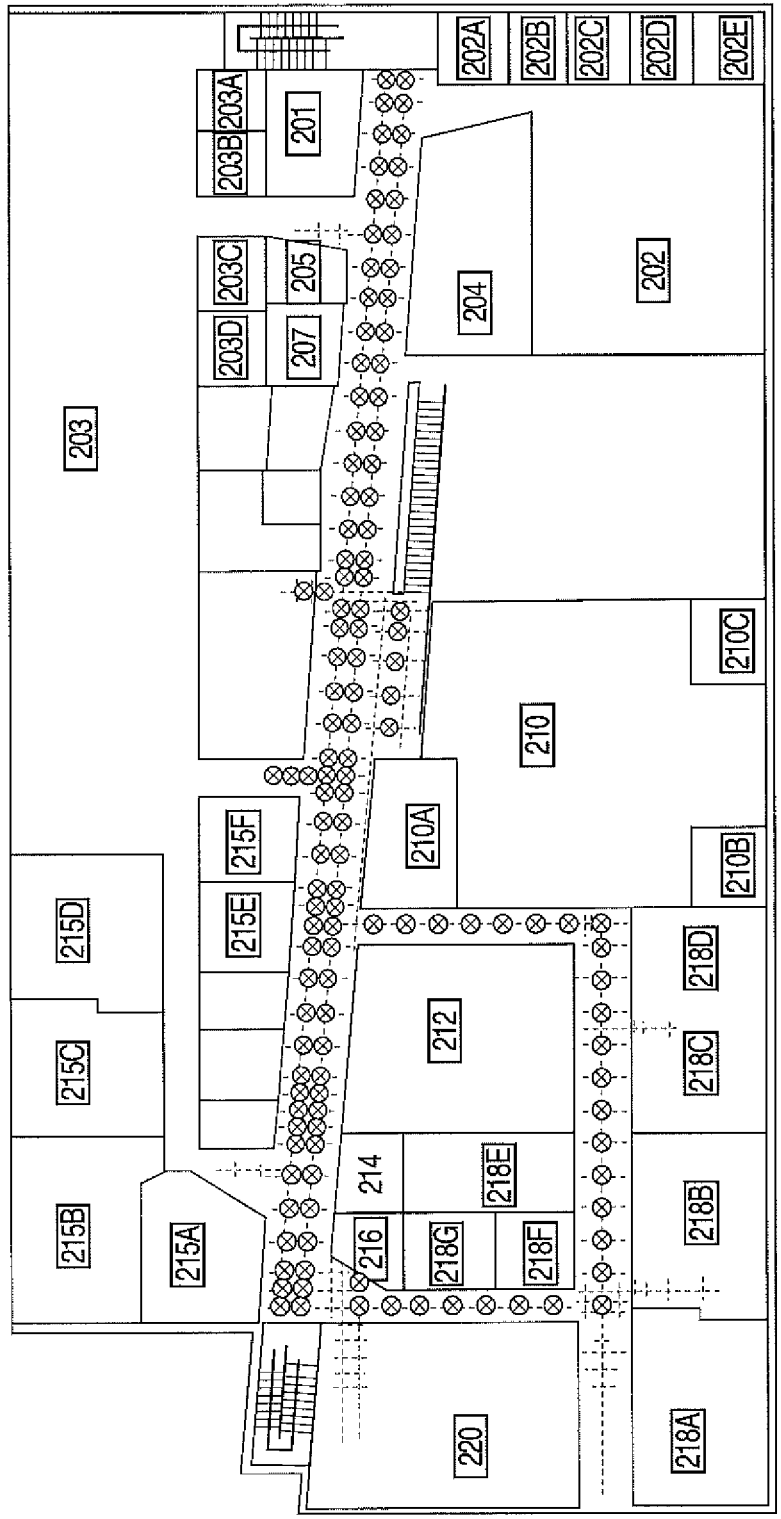
FIG. 19 shows RPs evenly distributed on a site with an average grid spacing of 1.5 m.

In order to evaluate the performance of the system, a complete RSS radio map database was collected on the second floor of the Canadian National Institute for the Blind (CNIB) in an area of approximately 18 m×36 m. Besides the 8 beacons 12 found on the site, 15 additional off-the-shelf beacons 12 (Linksys Wireless G Broadband Router WTR54G2) were deployed to ensure good coverage of the area of interest. 50RSS time samples were collected for each of the 128 RPs ($l+\mu=128$). The RPs were evenly distributed on the site with an average grid spacing of 1.5 m, as indicated in FIG. 19.

Performance Metrics

The performance of the RSS radio map prediction and the performance of localization using the predicted radio map are evaluated, respectively. In the radio map prediction, a small number of collected RSS-position data pairs are picked, denoted as labels. The rest of the RSS readings in the database are considered as unlabeled data. The corresponding location is learned by the proposed algorithm, and compared with the actual pre-measured location to evaluate the prediction accuracy.

The performance of the overall positioning system by using the predicted radio map is evaluated by two subjects who walked at approximately constant speed of 0.34 m/s along different traces on a different day. The traces were of different lengths, required different number of turns and were to different locations on the floor. Each online RSS reading is an average of 2 time samples. The characteristics of the traces are summarized in Table III.

TABLE III

Traces Summary

| Trace # | # of turns | # Repetitions | Distance | total # online RSS readings |
|---|---|---|---|---|
| 1 | 2 | 4 | 53.63 m | 248 |
| 2 | 2 | 4 | 29.43 m | 140 |
| 3 | 0 | 4 | 30.80 m | 135 |
| 4 | 4 | 2 | 91.84 m | 149 |

The localization error, which is measured by averaging the Euclidean distance between the estimated location of the mobile user and the actual location over a total number of 672 testing points, has been reported as the performance measure. The following 4 positioning algorithms are analyzed and compared.

RADAR: the solution to the fingerprinting-based RADAR system is the k-nearest neighbor algorithm, which estimates the mobile user's location by computing the centroid of the k closest neighbors that have the smallest Euclidean distance with respect to the online RSS readings. It is suggested in [1] that the best performance achieves when k=3, 4 and thus, k=3 is used in the evaluation.

Horus: Horus improves the RADAR positioning by using a statistical method, in which the probability of each potential position is analyzed based on the Bayesian theory. A parametric distribution such as the Gaussian distribution is used to approximate the signal-strength histogram for each RP. Then center of mass of the top candidate locations is calculated as the location estimate. In order to reduce the computational requirements, cluster defined as a set of RPs that share the same access points is used for coarse localization in Horus system.

Kernel-based positioning: Kernel-based algorithm is also a probabilistic approach, in which kernel functions are used for signal-strength distribution approximation. Center of mass of the top candidate locations is calculated as the final location estimate.

CS-based positioning: CS-based positioning algorithm consists of a coarse localization stage using cluster matching and a fine localization stage using compressive sensing.

Performance of RSS Radio Map Prediction

To test the performance of the RSS radio map prediction, it is possible to study the location prediction errors for reference points with respect to the number of beacons 12. In the experiment, there are a total number of 128 RSS readings, one time sample for each RP, and 20 of them are picked as labeled data with their positions marked, while 108 of them are unlabeled data with unknown location information. A graph is constructed based on RSS readings, and the graph weight is calculated by using compressive sensing. The learning system outputs predicted positions for 128 RPs, which are further compared with the actual measured positions. Since 50 time samples are collected for each RP, the experiment result is an average of 50 runs.

Figure 20:
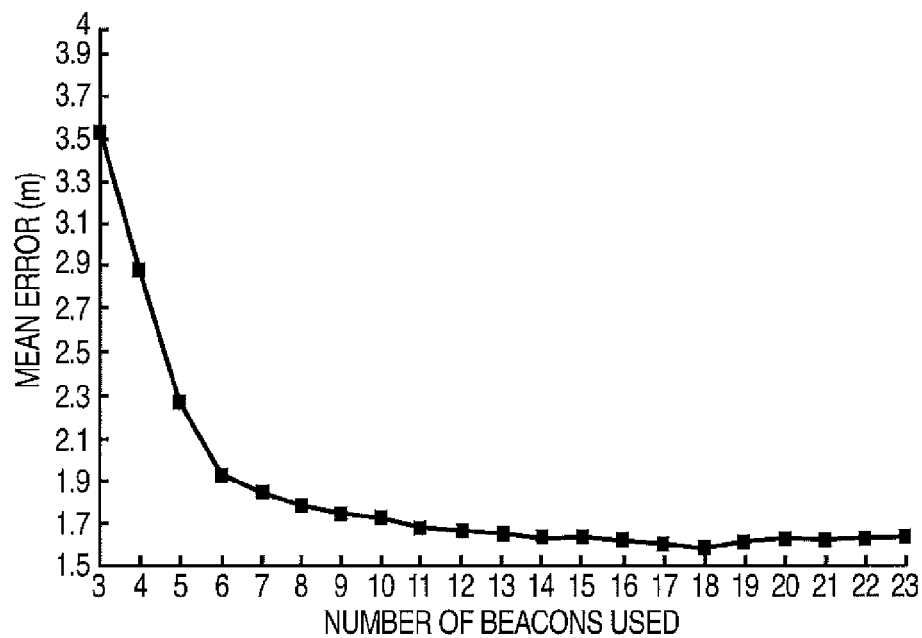
FIG. 20 illustrates that mean prediction error varies with the number of APs used.

FIG. 20 illustrates the mean prediction error varies with the number of used beacons 12. Strongest beacon selection scheme is used to generate the $\Phi$ matrix defined in equation (53). Based on the theory of compressive sensing, the number of beacons 12 (M) needed for reasonable recovery should approximately obey $\log(1+\mu)=\log(128)=7$. Therefore, when the number of beacons 12 conforms with the CS theory, the learning system can achieve a high performance in terms of the prediction accuracy. Meanwhile, as shown in FIG. 20, using more than 18 beacons 12 for location prediction decreases the accuracy, as a biased estimation generated by unreliable beacons 12 in introduced.

Figure 21:
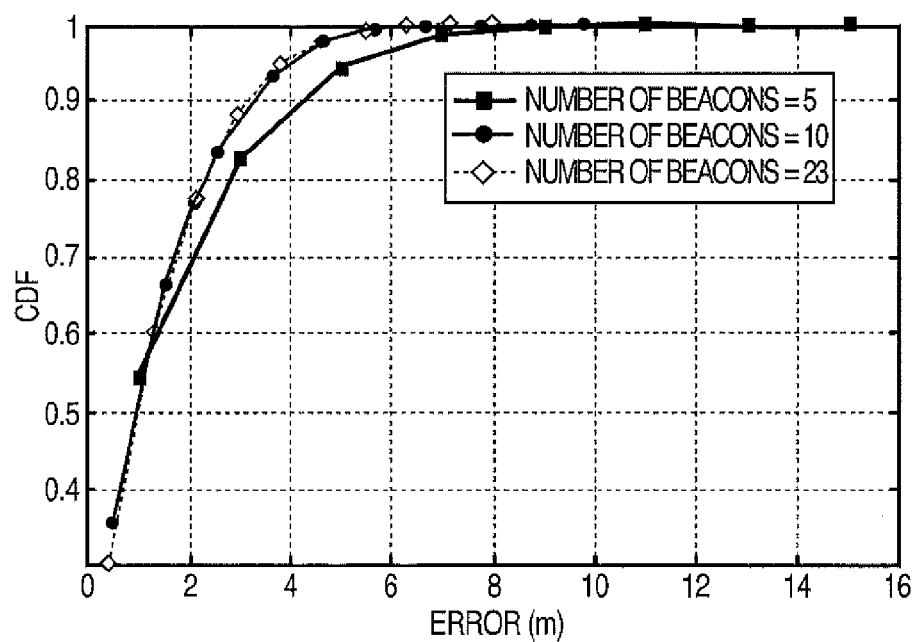
FIG. 21 shows a cumulative distribution function (CDF) of the prediction error of the learning system under different number of beacons.

FIG. 21 shows the cumulative distribution function (CDF) of the prediction error of the learning system under different number of beacons 12. It is clear that the performance of the learning system improves by increasing the number of beacons 12 to that is needed by the CS theory. When the number of beacons 12 is enough, the proposed learning system provides a stable 90th percentile error of 3.1 m.

The location prediction error for reference points are studied with respect to the number of labels. In the experiment, a total number of 128 RSS readings, one time sample for each RP, is considered. Instead of selecting the labels in the first experiment, the labels are randomly picked at each repetition, and the number of labels varies from 5 to 125. All of the 23 available beacons 12 are used. For a certain number of labels, the result is an average of 10 repetitions.

Figure 22:
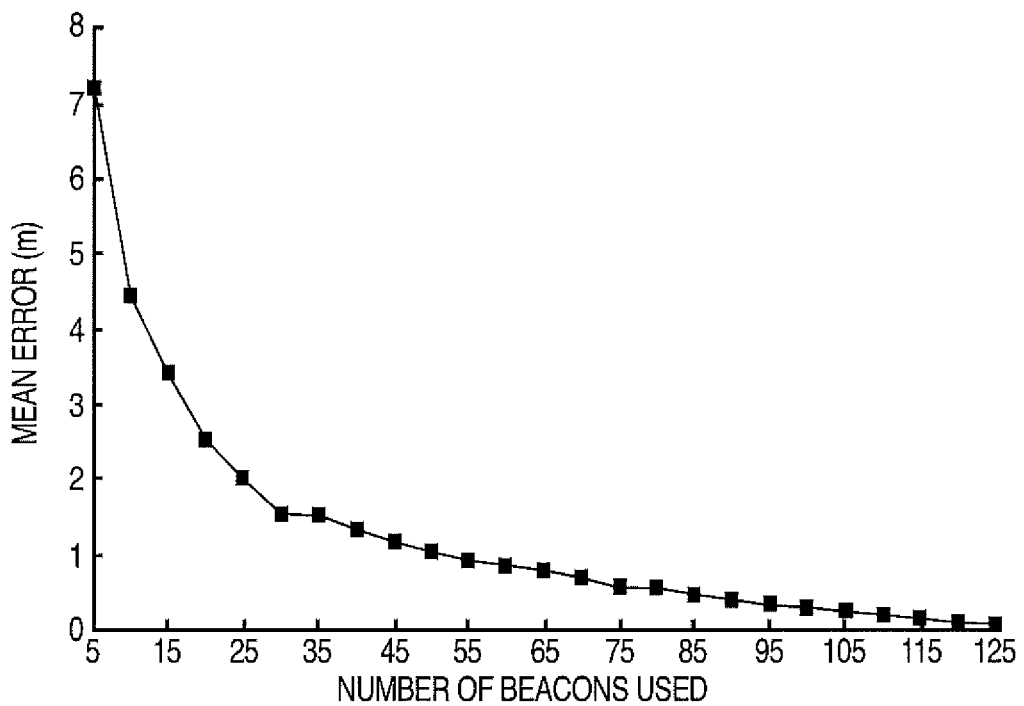
FIG. 22 shows an illustrative embodiment of the present system with 20 random labels (16%), providing an average of 2.5 m error in location prediction.

As expected, the learning system predicts more accurate position with more labels. As illustrated in FIG. 22, with 20 random labels (16%), the system provides an average of 2.5 m error in location prediction. Compared with FIG. 20, under the same situation, the prediction error can be reduced to 1.6 m by selecting the key nodes (e.g., turning points) as labels.

Performance of Localization

The performance of the localization system is evaluated based on the predicted radio map, and compared with the systems that work on manually collected fingerprint database. Both simulation and implementation results are provides. In the simulation, there are 50 traces, each with 128 RPs. One trace is randomly picked as a database that needs to be learn, and the rest of 49 traces with 128 RPs each as online testing points of the positioning system. During the learning procedure, 20 of the RPs are picked as labeled data, and 108 of the RPs are considered as unlabeled data without knowing their positions. Therefore, a complete RSS radio map can be learned for all of the 128 RPs on the single trace, named as a predicted database. Meanwhile, the pre-collected RSS-position pairs is named as a measured database. In the implementation, the online RSS readings are collected by two subjects walking along 4 different traces on a different day, including a total number of 672 testing points, as indicated in Table III.

The localization can be conducted in two ways. One is applying the traditional fingerprinting-based positioning algorithms on the predicted database, named as two-step solution. The other is taking the online RSS readings at testing points as new unlabeled data and the predicted database as labeled data to predict the positions of testing points through the learning system, named as one-step solution.

Figure 23:
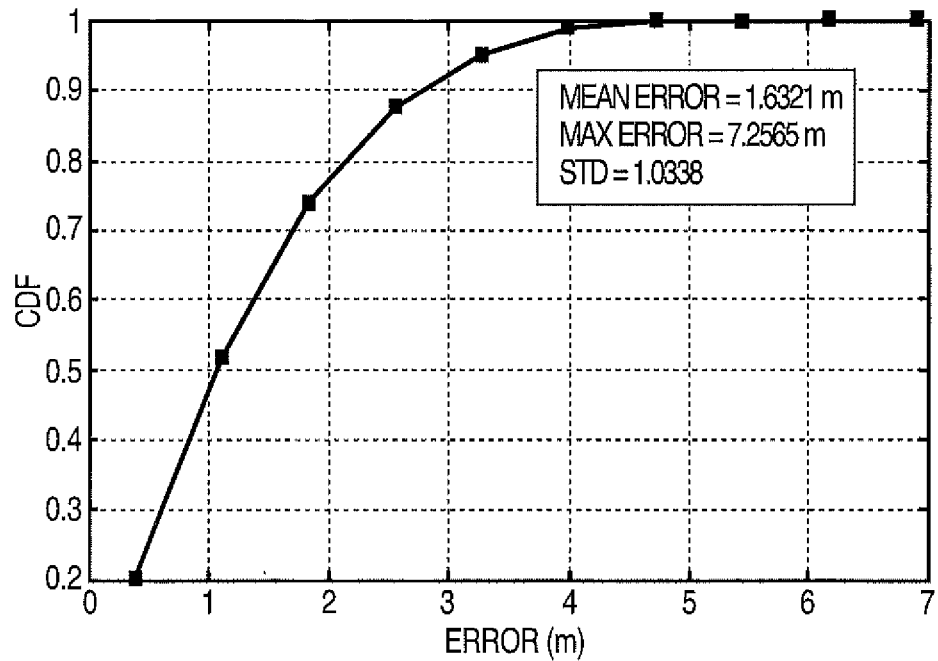
FIG. 23 shows a CDF of the localization error in an illustrative simulation scenario.

FIG. 23 shows the CDF of the localization error in the above simulation scenario. The result is an average of 49 runs. Since the proposed learning procedure is also a localization algorithm, for each run, the online RSS readings at 128 testing positions are considered as new unlabeled data, and the above one-step solution is applied for evaluating the positioning accuracy. During the simulation, all of the 23 available beacons 12 are used. Since more unlabeled data is adding to the system, the system is able to provide a 90th percentile error of 2.8 m with an average error of 1.6 m.

Figure 24:
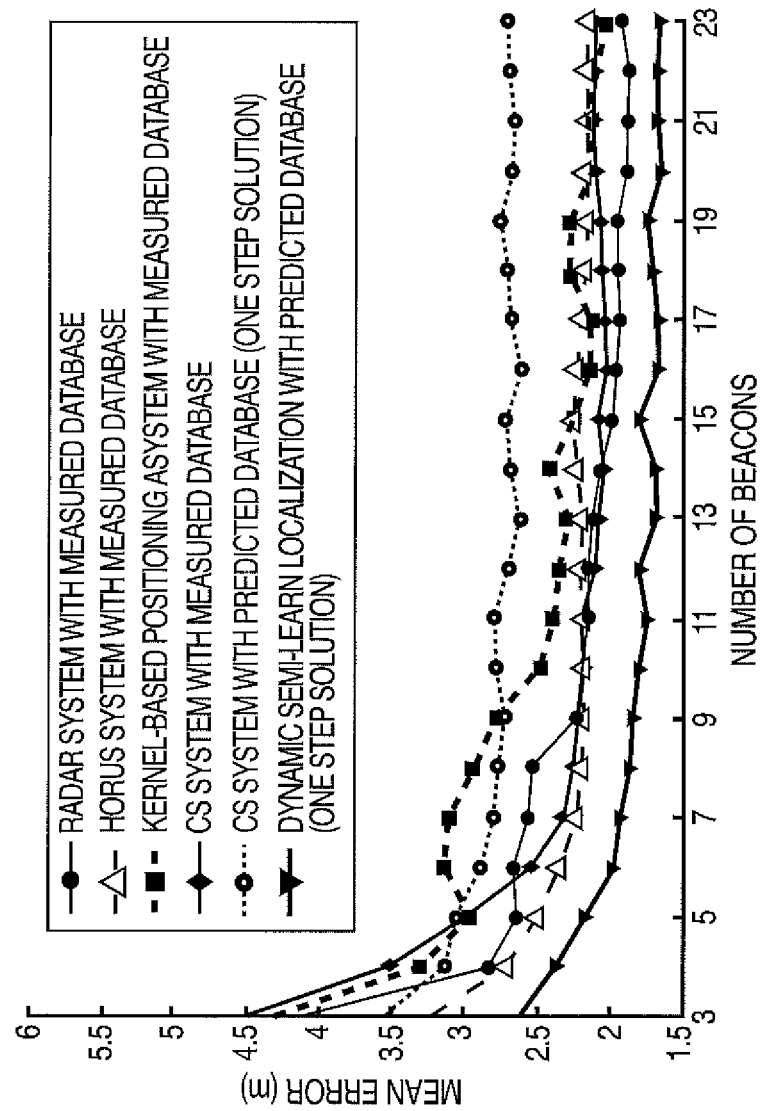
FIG. 24 shows an illustrative implementation result of the mean localization error with respect to the number of used beacons.

FIG. 24 shows the implementation result of the mean localization error with respect to the number of used beacons 12. Different scenarios are considered and compared. Four different positioning systems based on the measured database are illustrated as benchmarks. The two-step solution applies the compressive sensing-based positioning approach on the predicted database, while the one-step solution takes the online RSS readings as new unlabeled data and uses semi-supervised learning approach to predict the location. Strongest beacons 12 selection scheme is used over all the tests.

Consistent with the inventors' previous findings, the CS positioning system leads to the least localization error over the four benchmark positioning systems, where measured database is provided. Both of the two positioning systems using the predicted database perform worse than the CS system with measured database. However, the main advantage of the learning system is that it collects the RSS in a crowd sourced way and learns the database automatically and dynamically with only a small number of labels. In addition, the one-step solution provides a comparable localization accuracy to these benchmark systems in which extensive labor costs are involved.

Figure 25:
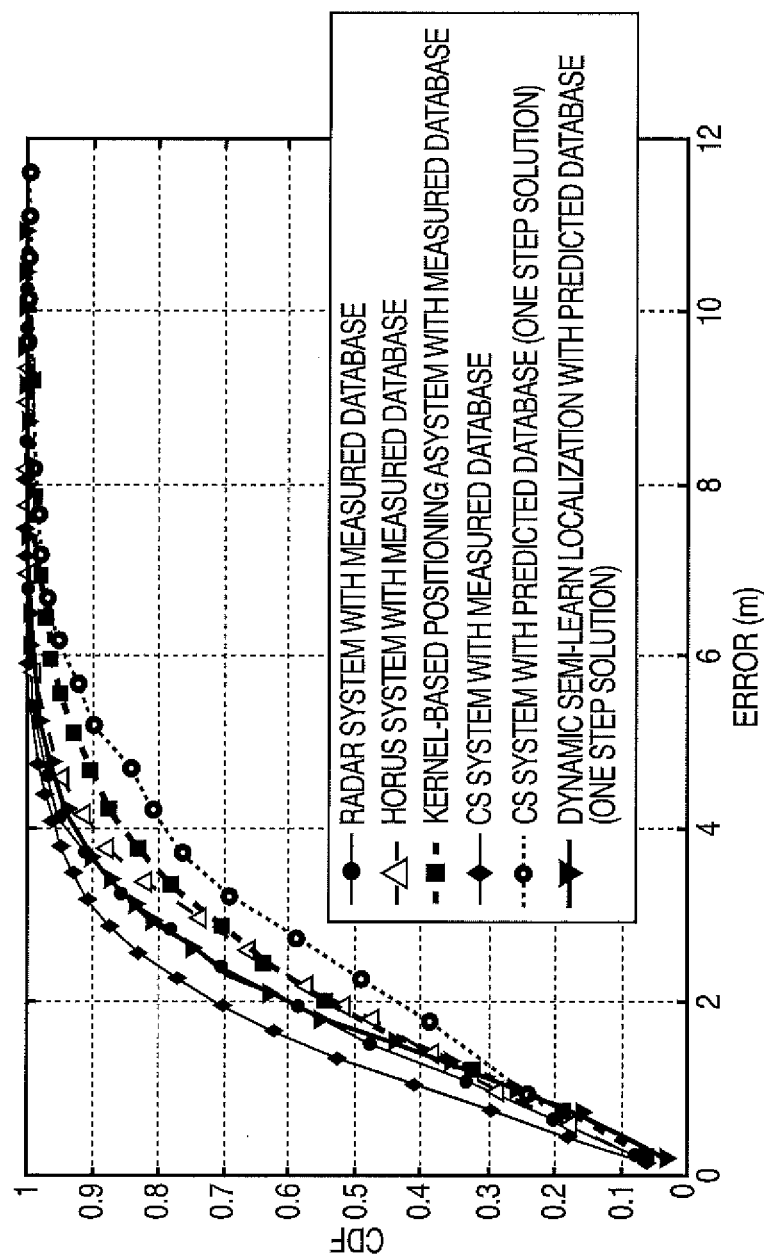
FIG. 25 depicts the CDF of the localization error obtained in the above scenarios, and Table IV lists the position error statistics.

FIG. 25 depicts the CDF of the localization error obtained in the above scenarios, and Table IV lists the position error statistics. The CS system with measured database performs the best, with 90th percentile error of 3.2 m. The one-step solution provides a 90th percentile error of 3.7 m, followed by the two-step solution with a value of 5.2 m.

TABLE IV

Position error statistics (14 APs used)

| Method | Mean [m] | $90^{th}$ [m] | Max [m] |
| --- | --- | --- | --- |
| RADAR, measured database | 2.07 | 3.71 | 10.67 |
| Horus, measured database | 2.23 | 4.10 | 9.73 |
| Kernel-based, measured database | 2.42 | 4.67 | 10.90 |
| CS-based, measured database | 1.69 | 3.20 | 7.47 |
| CS-based, predicted database | 2.69 | 5.21 | 12.06 |
| Learning by CS, predicted database | 2.04 | 3.69 | 6.65 |

Comparison

An EZ model may solve the labor cost problem by estimating unknown parameters in the radio propagation model using genetic algorithm. However, the algorithm is based on a good assumption on the radio propagation model. Due to the dynamic and unpredictable nature of radio channel, this approach can be prone to large error. Meanwhile, due to the high complexity of GA, the learning procedure is very slow. Different from the EZ model, the learning system proposed in this disclosure predicts the RSS radio map (fingerprint database) directly through an l1-minimization program. The radio map can be used as a database for online location estimation.

TABLE V

Implementation scenario and system performance comparison

| | Radio map prediction | | Localization | | |
| --- | --- | --- | --- | --- | --- |
| Method | EZ [14] | Semi-learn | EZ + Loc | Semi-learn + Loc* | Semi-learn + Loc** |
| Testing area | 27 m × 18 m | 36 m × 18 m | 27 m × 18 m | 36 m × 18 m | |
| # APs | 4 out of 48 | 14 out of 23 | 4 out of 48 | 14 out of 23 | |
| # labels | 3 | 20 | / | / | |
| # unlabels | 45 | 108 | / | / | |
| # Testing location | / | / | 40 | 672 | |
| 50% accuracy | 2.0 m | 1.4 m | 3.1 m | 2.2 m | 1.8 m |
| 80% accuracy | 3.3 m | 2.7 m | 4.4 m | 4.1 m | 2.9 m |

*two-step solution.
**one-step solution.

Since the two approaches are implemented in different scenarios based on different assumptions. Table V lists the experimental scenarios and the corresponding system performance in terms of the prediction accuracy and the localization accuracy. Table VI shows the time consumption for the two learning procedures. Since the proposed learning algorithm only involves linear programming and matrix manipulation, it is much faster than the EZ model, where GA is used. This helps to update the database automatically and dynamically in a faster pace. In addition, without the complexity constraint, it is able to learn more unlabeled data at a time. However, the disadvantage of the system is that CS requires a certain number of beacons 12 for an accurate position prediction.

TABLE VI

Time consumption

| | # of APs | # unlabels | # labels | time consumption | |
|---|---|---|---|---|---|
| EZ | 5 | 50 | 3 | Lenovo T61 65 mins | Server 53 min |
| Semi-learn | 14 | 108 | 20 | Acer Aspire 3820 2.23 sec | HTC Desire z (Mobile Phone) 3.35 min |

The foregoing description of embodiments has been presented for purposes of illustration and description. It is not intended to be exhaustive or to be limited to the precise forms disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto and their equivalents.

We claim:

1. A method of dynamically generating a radio map, the method comprising:
   configuring a processor to operate as a radio map generator;
   receiving, by the radio map generator, a set of known pairs (set of data elements, positions);
   receiving, by the radio map generator, a plurality of sets of data elements;
   automatically and dynamically generating, by the radio map generator, a radio map using compressive sensing and semi-supervised learning to:
   construct a graph structure G=(V,E) using the sets of data elements and the set of known pairs (set of data elements and position), V being a set of nodes of the graph structure, E being a set of edges connecting pairs of nodes of the graph structure, each node in the set of nodes V associated with a set of data elements from either the known pairs or the plurality of sets of data elements;
   calculate a weight for each edge of the set of edges E using a measure of similarity between the sets of data elements associated with the pair of nodes connected by the respective edge; and
   predict, for each of the plurality of sets of data elements, at least a corresponding position using the graph structure and the weights; and
   using the radio map to provide localization services to one or more mobile computing devices.

2. The method of claim 1, wherein each set of data elements represents a set of received signal strength (RSS) readings comprising RSS readings from one or more signals emitted from one or more beacons.

3. The method of claim 2, for each set of RSS readings, further comprising selecting a subset of the one or more network access beacons.

4. The method of claim 1, wherein the corresponding positions are at least one of a two-dimensional position, a three-dimensional position, and a four-dimensional position.

5. The method of claim 1, wherein the known pairs are collected during fingerprinting.

6. The method of claim 1, further comprising:
   representing each of the positions of the known pairs as nodes on the graph structure;
   for each of the plurality of sets of data elements, representing each corresponding position as a node on the graph structure.

7. The method of claim 6, further comprising predicting a location of nodes in the graph based on the known pairs.

8. The method of claim 1, wherein each weight is a real non-negative number.

9. The method of claim 1, wherein the graph structure has a sparse nature, and wherein the method further comprises calculating each weight as sparse signal recovery problem utilizing the compressive sensing.

10. The method of claim 1, further comprising expressing the set of data elements for a node of the graph structure as an approximate linear combination of the sets of data elements for adjacent nodes connected by an edge of the set of edges E.

11. The method of claim 10, further comprising using a heat kernel function to compensate for error induced for incorrect adjacent nodes.

12. The method of claim 1, further comprising generating a user interface illustrating each corresponding position.

13. The method of claim 1, further comprising determining the known pairs using a fingerprint database.

14. The method of claim 1, wherein a ratio of a number of sets of data elements to a number of known pairs is at least greater than 2.

15. The method of claim 1, further comprising verifying the constructed graph structure for the radio map by comparing an actual pre-measured position with a predicated position based on the constructed graph structure for the radio map.

16. The method of claim 1, wherein each of the known pairs comprises a set of data elements and a corresponding position.

17. The method of claim 1, the positions corresponding to the sets of data elements represent at least one of a product location, a child location, a consumer location, a medical patient location and a medical station location.

18. The method of claim 1, wherein the radio map represents at least one of an image library for a collection of images, an handwriting sample library for a collection of handwriting samples, a voice recognition library for a collection of speech samples, an image library for a collection of images, a genetic information classification library for a collection of genetic information records, a gaming element library for a collection of game elements, and an audio/visual content library for a collection of audio/visual content elements.

19. The method of claim 1 further comprising clustering the plurality of sets of data elements and adjusting outliers of the plurality of sets of data elements when constructing the graph structure.

20. The method of claim 1 further comprising determining at least one location of at least one of the one or more mobile devices using a coarse localization based on cluster matching and a fine localization based on additional compressive sensing.

21. A system of dynamically generating a radio map to be used for providing localization services to one or more mobile computing devices, comprising:
  a processor configured to operate as a radio map generator, wherein the radio map generator:
  receives a set of known pairs (set of data elements, positions);
  receives a plurality of sets of data elements;
  automatically and dynamically generates a radio map using compressive sensing and semi-supervised learning to:
  construct a graph structure G=(V, E) using the sets of data elements and the set of known pairs (set of data elements and position), V being a set of nodes of the graph structure, E being a set of edges connecting pairs of nodes of the graph structure, each node in the set of nodes V associated with a set of data elements from either the known pairs or the plurality of sets of data elements; and
  calculate a weight for each edge of the set of edges E using a measure of similarity between the sets of data elements associated with the pair of nodes connected by the respective edge; and
  predict, for each of the plurality of sets of data elements, a corresponding position using the graph structure and the weights.

22. The system of claim 21, wherein each set of data elements represents a set of received signal strength (RSS) readings comprising RSS readings from one or more signals emitted from one or more beacons.

23. The system of claim 22, wherein at least some of the beacons comprise network access points.

24. The system of claim 21, wherein the radio map generator receives the sets of RSS readings from a plurality of mobile devices.

25. The system of claim 21, wherein the processor is disposed within at least one of the following a cell phone, a tablet, a vehicle, a medical device, and a server.

26. A non-transitory computer-readable storage medium storing one or more sequences of instructions which, when executed by one or more processors, causes the one or more processors to perform a method of dynamically generating a radio map to be used for providing localization services to one or more mobile computing devices, the method comprising:
  configuring a processor to operate as a radio map generator;
  receiving, by the radio map generator, a plurality of sets of data elements and a set of known pairs (set of data elements, positions);
  automatically and dynamically generating, by the radio map generator, a radio map using compressive sensing and semi-supervised learning to:
  construct a graph structure G=(V,E) using the sets of data elements and the set of known pairs (set of data elements and position), V being a set of nodes of the graph structure, E being a set of edges connecting pairs of nodes of the graph structure, each node in the set of nodes V associated with a set of data elements from either the known pairs or the plurality of sets of data elements;
  calculate a weight for each edge of the set of edges E using a measure of similarity between the sets of data elements associated with the pair of nodes connected by the respective edge; and
  predict, for each of the plurality of sets of data elements, a corresponding position using the graph structure and the weights.

\* \* \* \* \*